US010129860B2

(12) United States Patent
Aiba et al.

(10) Patent No.: US 10,129,860 B2
(45) Date of Patent: Nov. 13, 2018

(54) MOBILE COMMUNICATION SYSTEM, BASE STATION APPARATUS, MOBILE STATION APPARATUS AND COMMUNICATION METHOD

(71) Applicant: Sharp Kabushiki Kaisha, Sakai, Osaka (JP)

(72) Inventors: Tatsushi Aiba, Osaka (JP); Shohei Yamada, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 191 days.

(21) Appl. No.: 15/354,266

(22) Filed: Nov. 17, 2016

(65) Prior Publication Data
US 2017/0070988 A1     Mar. 9, 2017

Related U.S. Application Data

(60) Continuation of application No. 14/283,066, filed on May 20, 2014, now Pat. No. 9,504,023, which is a
(Continued)

(30) Foreign Application Priority Data

Nov. 27, 2009  (JP) .................................. 2009-269630

(51) Int. Cl.
*H04W 72/04* (2009.01)
*H04B 1/7087* (2011.01)
(Continued)

(52) U.S. Cl.
CPC ...... *H04W 72/0413* (2013.01); *H04B 1/7087* (2013.01); *H04L 1/1812* (2013.01);
(Continued)

(58) Field of Classification Search
CPC ... H04J 3/1694; H04J 3/16; H04J 3/06; H04R 25/554; H04R 25/55; H04R 2225/55
(Continued)

(56) References Cited

U.S. PATENT DOCUMENTS 8,948,116 B2 *  2/2015  Whinnett .............. H04L 1/0027
                                                 370/329
2010/0041430 A1   2/2010  Ishii et al.
(Continued)

OTHER PUBLICATIONS

CATT, Potevio, "Benefits of Carrier Indicator on Multi-Channel ACK/NACK Transmission", 3GPP TSG RAN WG1 Meeting #58, R1-093537, Shenzhen, China, Aug. 24-28, 2009, 3 pages.
(Continued)

*Primary Examiner* — Kwang B Yao
*Assistant Examiner* — Syed M Bokhari
(74) *Attorney, Agent, or Firm* — Birch, Stewart, Kolasch & Birch, LLP

(57) ABSTRACT

A mobile station (MS) receives a parameter used for configuring PUCCH resources, the PUCCH resources being configured on an uplink component carrier (UCC) on which HARQ control information is transmitted on a PUCCH; determines a first PUCCH resource on the UCC for a first PDSCH transmission indicated by a detection of a first PDCCH in a sub-frame on a first downlink component carrier (DCC), the first PUCCH resource being determined based on a control channel element of the first PDCCH; determines a second PUCCH resource on the UCC for a second PDSCH transmission indicated by a detection of a second PDCCH in the sub-frame on a second DCC, the second PUCCH resource being determined from the PUCCH resources which are configured; and transmits information bits using one of the first or the second PUCCH resource, the information bits being used for indicating the HARQ control information.

8 Claims, 8 Drawing Sheets

Related U.S. Application Data division of application No. 13/481,454, filed on May 25, 2012, now Pat. No. 8,767,655, which is a continuation of application No. PCT/JP2010/071050, filed on Nov. 25, 2010.

(51) Int. Cl.
  *H04L 1/18* (2006.01)
  *H04L 5/00* (2006.01)
  *H04W 72/12* (2009.01)
  *H04J 11/00* (2006.01)

(52) U.S. Cl.
  CPC .......... *H04L 1/1854* (2013.01); *H04L 1/1861* (2013.01); *H04L 5/0053* (2013.01); *H04L 5/0055* (2013.01); *H04L 5/0091* (2013.01); *H04W 72/042* (2013.01); *H04W 72/1273* (2013.01); *H04J 11/0023* (2013.01); *H04W 72/1263* (2013.01)

(58) Field of Classification Search
  USPC .......................................... 370/330; 381/312
  See application file for complete search history.

(56) References Cited

U.S. PATENT DOCUMENTS

| | | |
|---|---|---|
| 2011/0075611 A1 | 3/2011 | Choi |
| 2011/0243066 A1 | 10/2011 | Nazar et al. |
| 2013/0114543 A1 | 5/2013 | Whinnett et al. |

OTHER PUBLICATIONS

Ericsson, "LTE-Advanced-LTE evolution towards IMT-Advanced Technology Components", 3GPP TSG RAN IMT Advanced Workshop, REV-080030, Shenzhen, China, Apr. 7-8, 2008.
International Search Report issued in PCT Application No. PCT/JP2010/071050 dated Dec. 21, 2010.
LG Electronics, "UL control channel design to support carrier aggregation", 3GPP TSG RAN WG1 #56bis, R1-091204, Seoul, Korea, Mar. 23-27, 2009.
Lucent Technologies, "EDCH System Performance with HARQ," 3GPP TSG RAN WG1 #37, May 10-15, 2004, Montreal, Canada, R1-040468, 2 pages.
NEC, "Component carrier configuration/activation for carrier aggregation", 3GPP TSG RAN2 Meeting #67bis, R2-095576, Miyazaki, Japan, Oct. 12-16, 2009.
Nokia Siemens Networks, Nokia, "UL Control Signalling to Support Bandwidth Extension in LTE-Advanced", 3GPP TSG RAN WG1 Meeting #56, R1-090724, Athens, Greece, Feb. 9-13, 2009, 5 pages.
NTT DOCOMO, "Initial Access Procedure for Asymmetric Wider Bandwidth in LTE-Advanced", 3GPP TSG RAN WG1 Meeting#55, R1-084249, Prague, Czech Republic, Nov. 10-14, 2008.
Panasonic, "UL ACK/NACK Transmission on PUCCH for Carrier Aggregation", 3GPP TSG-RAN WG1 Meeting #59, R1-094503, Jeju, Korea, Nov. 9-13, 2009, 2 pages.
Panasonic, "PUCCH resource allocation schemes for carrier aggregation", 3GPP TSG RAN WG1 Meeting #58bis, R1-093943, Miyazaki, Japan, Oct. 12-16, 2009.
U.S. Notice of Allowance issued in U.S. Appl. No. 13/481,454 dated Feb. 21, 2014.
U.S. Office Action issued in U.S. Appl. No. 13/481,454 dated Oct. 11, 2013.
U.S. Notice of Allowance issued in U.S. Appl. No. 14/283,066 dated Jul. 21, 2016.

* cited by examiner

MOBILE COMMUNICATION SYSTEM, BASE STATION APPARATUS, MOBILE STATION APPARATUS AND COMMUNICATION METHOD

CROSS-REFERENCE TO RELATED APPLICATIONS

This application is Continuation of pending U.S. application Ser. No. 14/283,066 filed on May 20, 2014; which is a Divisional application of U.S. application Ser. No. 13/481,454, filed on May 25, 2012, granted as U.S. Pat. No. 8,767,655, Issued on Jul. 1, 2014; which is a Bypass Continuation application of PCT International Application No. PCT/JP2010/071050 filed on Nov. 25, 2010; which claims the benefit to Japanese Patent Application No. JP2009-269630 filed in Japan, on Nov. 27, 2009. The entire contents of all of the above applications are hereby incorporated by reference.

TECHNICAL FIELD

The present invention relates to a mobile communication system including a base station apparatus and a mobile station apparatus and to a communication method.

BACKGROUND ART

The 3GPP (3rd generation partnership project) is a project that examines and prepares specifications of a mobile communication system based on a network in which W-CDMA (Wideband-code division multiple access) and GSM (Global system for mobile communications). In the 3GPP, W-CDMA system is standardized as the third generation cellular mobile communication system, and its services have been successively started. HSDPA (High-speed downlink packet access) in which a communication speed is further increased is also standardized, and its services are started. In the 3GPP, the evolution of the third generation radio access technology (hereinafter referred to as "LTE (long term evolution" or "SUTRA (evolved universal terrestrial radio access)") and a broadband frequency band are utilized, and thus a mobile communication system for realizing the high speed transmission and reception of data (hereinafter referred to as an "LTE-A (long term evolution-advanced" or an "advanced-EUTRA") is being examined.

As the communication system in the LTE, an OFDMA (orthogonal frequency division multiple access) system in which subcarriers orthogonal to each other are used to perform user multiplexing and an SC-FDMA (single carrier-frequency division multiple access) system are being examined. Specifically, in a downlink, the OFDMA system which is a multi-carrier communication system is proposed, and, in an uplink, the SC-FDMA system which is a single-carrier communication system is proposed.

On the other hand, as the communication system in the LTE-A, in a downlink, the introduction of the OFDMA system is being examined, and, in an uplink, in addition to the SC-FDMA system, the introduction of the OFDMA system and a clustered-SC-FDMA (clustered-single carrier-frequency division multiple access, also referred to as DFTs-OFDM with spectrum division control) system is being examined. Here, in the LTE and the LTE-A, the SC-FDMA system proposed as an uplink communication system has the feature of being able to reduce a PAPR (peak to average power ratio: transmit power) when data is transmitted.

Whereas a frequency band used in a general mobile communication system is contiguous, in the LTE-A, it is examined that a plurality of contiguous/discontiguous frequency bands (hereinafter referred to as a "carrier element, carrier component (CC)" or an "element carrier, component carrier (CC)") are used in a composite manner and are managed as one broadband frequency band (frequency band aggregation: also referred to as spectrum aggregation, carrier aggregation, frequency aggregation or the like) (non-patent document 1). Furthermore, it is also proposed that, in order for a base station apparatus and a mobile station apparatus to more flexibly use a broadband frequency band to perform communications, a frequency band used in a downlink communication and a frequency band used in an uplink communication are made to have different frequency bandwidths (asymmetric frequency band aggregation: asymmetric carrier aggregation) (non-patent document 2).

FIG. 7 is a diagram illustrating a mobile communication system on which frequency band aggregation has been performed in a conventional technology. That, as shown in FIG. 7, a frequency band used in downlink (hereinafter also referred to as DL) communication and a frequency band used in uplink (hereinafter also referred to as UL) communication are made to have the same bandwidth is also referred to as symmetric frequency band aggregation (symmetric carrier aggregation). As shown in FIG. 7, a base station apparatus and a mobile station apparatus use a plurality of carrier elements that are a contiguous and/or discontiguous frequency band in a composite manner, and thereby can perform communications in a broadband frequency band composed of a plurality of carrier elements. FIG. 7 shows, as an example, that a frequency band (hereinafter also referred to as a DL system band, a DL system bandwidth) used in downlink communication having a 100 MHz bandwidth is composed of five downlink carrier elements (DCC1: downlink component carrier 1, DCC2, DCC3, DCC4 and DCC 5) each having a 20 MHz bandwidth. FIG. 7 also shows, as an example, that a frequency band (hereinafter also referred to as a UL system band, a UL system bandwidth) used in uplink communication having a 100 MHz bandwidth is composed of five uplink carrier elements (UCC1: uplink component carrier 1, DCC2, UCC3, UCC4 and UCC 5) each having a 20 MHz bandwidth.

In FIG. 7, in each of the downlink carrier elements, downlink channels such as a physical downlink control channel (hereinafter referred to as a PDCCH) and a physical downlink shared channel (hereinafter referred to as a PDSCH) are allocated. The base station apparatus can use the PDCCH to transmit, to the mobile station apparatus, control information (resource assignment information, MCS (modulation and coding scheme) information, HARQ (hybrid automatic repeat request) processing information and the like) for transmitting a downlink transport block transmitted using the PDSCH, and can use the PDSCH to transmit the downlink transport block to the mobile station apparatus. In other words, in FIG. 7, the base station apparatus can transmit up to five downlink transport blocks at the maximum to the mobile station apparatus in the same subframe.

In each of the uplink carrier elements, uplink channels such as a physical uplink control channel (hereinafter referred to as a PUCCH) and a physical uplink shared channel (hereinafter referred to as a PUSCH) are allocated. The mobile station apparatus can use the PUCCH and/or the PUSCH to transmit, to the base station apparatus, control information of HARQ for the PDCCH and/or the downlink transport block (hereinafter also referred to as control information of HARQ). Here, the control information of HARQ refers to information (signal) indicating ACK/NACK (positive acknowledgment/negative acknowledgment) and/or information (signal) indicating DTX (discontiguous transmission). The information indicating the DTX refers to information indicating that the mobile station apparatus cannot detect the PDCCH transmitted from the base station apparatus. Here, in FIG. 7, there may be a downlink/uplink carrier element where any of downlink/uplink channels such as the PDCCH, the PDSCH, the PUCCH and the PUSCH is not allocated.

Likewise, FIG. 8 is a diagram illustrating a mobile communication system on which asymmetric frequency band aggregation (asymmetric carrier aggregation) has been performed in the conventional technology. As shown in FIG. 8, in the base station apparatus and the mobile station apparatus, the frequency band used in the downlink communication and the frequency band used in the uplink communication are made to have different bandwidths, carrier elements which are a contiguous and/or discontiguous frequency band constituting these frequency bands are used in a composite manner and thus communications can be performed in a broadband frequency band. FIG. 8 shows, as an example, that a frequency band used in the downlink communication having a 100 MHz bandwidth is composed of five downlink carrier elements (DCC1, DCC2, DCC3, DCC4 and DCC 5) each having a 20 MHz bandwidth. FIG. 7 also shows that a frequency band used in the uplink communication having a 40 MHz bandwidth is composed of two uplink carrier elements (UCC1 and UCC 2) each having a 20 MHz bandwidth. In FIG. 8, in each of the downlink/uplink carrier elements, downlink/uplink channels are allocated, and the base station apparatus can use a plurality of PDSCHs assigned by a plurality of PDCCHs, to transmit a plurality of downlink transport blocks to the mobile station apparatus in the same subframe. The mobile station apparatus can use the PUCCH and/or the PUSCH to transmit control information of HARQ to the base station apparatus.

Non-patent document 1: "LTE-Advanced-LTE evolution towards IMT-Advanced Technology components", 3GPP TSG RAN IMT Advanced Workshop, REV-080030, Apr. 7-8, 2008.

Non-patent document 2: "Initial Access Procedure for Asymmetric Wider Bandwidth in LTE-Advanced", 3GPP TSG RAN WG1 Meeting #55, R1-084249, Nov. 10-14, 2008.

DISCLOSURE OF THE INVENTION

However, in the conventional technology, it is not specifically clear how the base station apparatus and the mobile station apparatus transmit and receive control information of HARQ when communication is performed using a broadband frequency band composed of a plurality of carrier elements.

When the mobile station apparatus transmits the control information of HARQ to the base station apparatus, consideration needs to be given to transmit power of the mobile station apparatus. For example, in order for the mobile station apparatus to use a large number of uplink carrier elements (using a large number of channels) in the same subframe to transmit a plurality of pieces of control information of HARQ, it is necessary to transmit the control information of HARQ with an extremely high power. For example, if the mobile station apparatus uses all five PUCCHs allocated in each of the five uplink carrier elements in the same subframe, to transmit the control information of HARQ to the base station apparatus, the mobile station apparatus needs to have an ability to transmit the control information of HARQ with an extremely high power. Increasing the ability of transmit power in the mobile station apparatus leads to increasing the ability of power amplifier (PA) or the like incorporated in the mobile station apparatus, which increases the cost of mobile station apparatus.

As described above, in the conventional technology, since it is not specifically clear how the base station apparatus and the mobile station apparatus transmit and receive the control information of HARQ when communication is performed using broadband frequency band composed of a plurality of carrier elements, the transmit power of the mobile station apparatus is disadvantageously increased.

The present invention is made in view of the foregoing situation; an object of the present invention is to provide a mobile communication system, a base station apparatus, a mobile station apparatus and a communication method in which the base station apparatus and the mobile station apparatus can effectively transmit and receive the control information of HARQ in consideration of the transmit power of the mobile station apparatus when communication is performed using a broadband frequency band composed of a plurality of carrier elements.

(1) To achieve the above object, the present invention takes the following measures. Specifically, the mobile communication system of the present invention is a mobile communication system in which a base station apparatus sets a plurality of downlink component carriers for a mobile station apparatus, wherein the base station apparatus transmits a downlink transport block to the mobile station apparatus on one or a plurality of downlink component carriers among the plurality of downlink component carriers, and the mobile station apparatus transmits, to the base station apparatus, control information of HARQ for the downlink transport block in any one of physical uplink control channel resources corresponding to the one or plurality of downlink component carriers on which the downlink transport block has been transmitted.

(2) Further, the mobile communication system of the present invention is a mobile communication system in which a base station apparatus sets a plurality of downlink component carriers for a mobile station apparatus, wherein the base station apparatus transmits, in a physical downlink shared channel, a downlink transport block to the mobile station apparatus on one or a plurality of downlink component carriers among the plurality of downlink component carriers, and the mobile station apparatus transmits, to the base station apparatus, control information of HARQ for the downlink transport block in any one of physical uplink control channel resources corresponding to the physical downlink shared channel.

(3) Further, in the mobile communication system of the present invention, the control information of HARQ is information indicating ACK/NACK.

(4) Further, in the mobile communication system of the present invention, the control information of HARQ is information indicating DTX (discontiguous transmission).

(5) Further, the base station apparatus of the present invention is a base station apparatus that sets a plurality of downlink component carriers for a mobile station apparatus, the base station apparatus comprising: a unit that transmits a downlink transport block to the mobile station apparatus on one or a plurality of downlink component carriers among the plurality of downlink component carriers; and a unit that receives, from the base station apparatus, control information of HARQ for the downlink transport block in any one of physical uplink control channel resources corresponding to the one or plurality of downlink component carriers on which the downlink transport block has been transmitted.

(6) Further, the base station apparatus of the present invention is a base station apparatus that sets a plurality of downlink component carriers for a mobile station apparatus, the base station apparatus comprising: a unit that transmits, in a physical downlink shared channel, a downlink transport block to the mobile station apparatus on one or a plurality of downlink component carriers among the plurality of downlink component carriers; and a unit that receives, from the mobile station apparatus, control information of HARQ for the downlink transport block in any one of physical uplink control channel resources corresponding to the physical downlink shared channel.

(7) Further, in the base station apparatus of the present invention, the control information of HARQ is information indicating ACK/NACK.

(8) Further, in the base station apparatus of the present invention, the control information of HARQ is information indicating DTX (discontiguous transmission).

(9) Further, the mobile station apparatus of the present invention is a mobile station apparatus for which a plurality of downlink component carriers is set by a base station apparatus, the mobile station apparatus comprising: a unit that receives a downlink transport block from the base station apparatus on one or a plurality of downlink component carriers among the plurality of downlink component carriers; and a unit that transmits, to the base station apparatus, control information of HARQ for the downlink transport block in any one of physical uplink control channel resources corresponding to the one or plurality of downlink component carriers on which the downlink transport block has been transmitted.

(10) Further, the mobile station apparatus of the present invention is a mobile station apparatus for which a plurality of downlink component carriers is set by a base station apparatus, the mobile station apparatus comprising: a unit that receives, in a physical downlink shared channel, a downlink transport block from the base station apparatus on one or a plurality of downlink component carriers among the plurality of downlink component carriers; and a unit that transmits, to the base station apparatus, control information of HARQ for the downlink transport block in any one of physical uplink control channel resources corresponding to the physical downlink shared channel.

(11) Further, in the mobile station apparatus of the present invention, the control information of HARQ is information indicating ACK/NACK.

(12) Further, in the mobile station apparatus of the present invention, the control information of HARQ is information indicating DTX (discontiguous transmission).

(13) Further, the communication method of the present invention is a communication method of abase station apparatus for setting a plurality of downlink component carriers for a mobile station apparatus, comprising the steps of: transmitting a downlink transport block to the mobile station apparatus on one or a plurality of downlink component carriers among the plurality of downlink component carriers; and receiving, from the mobile station apparatus, control information of HARQ for the downlink transport block in any one of physical uplink control channel resources corresponding to the one or plurality of downlink component carriers on which the downlink transport block has been transmitted.

(14) Further, the communication method of the present invention is a communication method of a base station apparatus for setting a plurality of downlink component carriers for a mobile station apparatus, comprising the steps of: transmitting, in a physical downlink shared channel, a downlink transport block to said mobile station apparatus on one or a plurality of downlink component carriers among said plurality of downlink component carriers; and receiving, from said mobile station apparatus, control information of HARQ for said downlink transport block in any one of physical uplink control channel resources corresponding to said physical downlink shared channel.

(15) Further, in the communication method of the present invention, the control information of HARQ is information indicating ACK/NACK.

(16) Further, in the communication method of the present invention, the control information of HARQ is information indicating DTX (discontiguous transmission).

(17) Further, the communication method of the present invention is a communication method of a mobile station apparatus in which a plurality of downlink component carriers is set by a base station apparatus, comprising the steps of: receiving a downlink transport block from the base station apparatus on one or a plurality of downlink component carriers among the plurality of downlink component carriers; and transmitting, to the base station apparatus, control information of HARQ for the downlink transport block in any one of physical uplink control channel resources corresponding to the one or plurality of downlink component carriers on which the downlink transport block has been transmitted.

(18) Further, the communication method of the present invention is a communication method of a mobile station apparatus in which a plurality of downlink component carriers is set by a base station apparatus, comprising the steps of: receiving, in a physical downlink shared channel, a downlink transport block from the base station apparatus on one or a plurality of downlink component carriers among the plurality of downlink component carriers; and transmitting, to the base station apparatus, control information of HARQ for the downlink transport block in any one of physical uplink control channel resources corresponding to the physical downlink shared channel.

(19) Further, in the communication method of the present invention, the control information of HARQ is information indicating ACK/NACK.

(20) Further, in the communication method of the present invention, the control information of HARQ is information indicating DTX (discontiguous transmission).

According to the present invention, the base station apparatus and the mobile station apparatus that perform communications using a broadband frequency band composed of a plurality of carrier elements can effectively transmit and receive control information of HARQ.

BEST MODES FOR CARRYING OUT THE INVENTION

Figure 1:
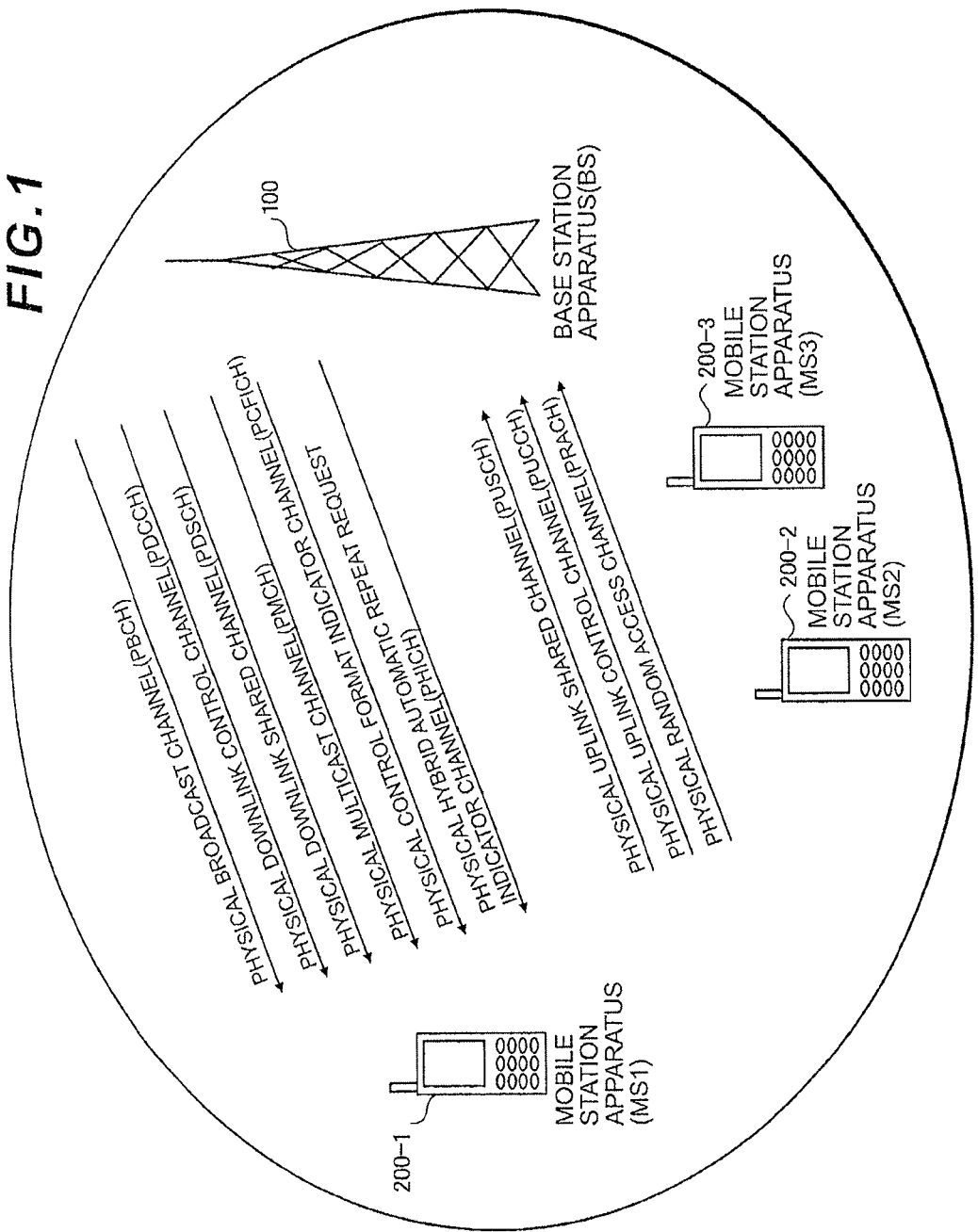
FIG. 1 is a diagram conceptually showing the configuration of a physical channel.

An embodiment of the present invention will now be described with reference to accompanying drawings. FIG. 1 is a diagram showing an example of the configuration of a channel in the embodiment of the present invention. A downlink physical channel is configured with a physical broadcast channel (PBCH), a physical downlink control channel (PDCCH), a physical downlink shared channel (PDSCH), a physical multicast channel (PMCH), a physical control format indicator channel (PCFICH) and a physical hybrid ARQ indicator channel (PHICH). An uplink physical channel is configured with a physical uplink shared channel (PUSCH), a physical uplink control channel (PUCCH) and a physical random access channel (PRACH).

The physical broadcast channel (PBCH) maps a broadcast channel (BCH) at intervals of 40 milliseconds. Blind detection is performed on the timing of 40 milliseconds. In other words, explicit signaling is not performed for provision of timing. A subframe including the physical broadcast channel (PBCH) is decodable by itself (self-decodable).

The physical downlink control channel (PDCCH) is a channel used for notification (transmission) of the resource assignment of the physical downlink shared channel (PDSCH), hybrid automatic repeat request (HARQ) information for downlink data and an uplink transmission permission that is the resource assignment of the physical uplink shared channel (PUSCH) to a mobile station apparatus. The PDCCH is composed of a plurality of control channel elements (CCE); the mobile station apparatus detects the PDCCH composed of the CCEs to thereby receive the PDCCH from the base station apparatus. The CCE is composed of a plurality of resource element groups (REG, also referred to as a mini-CCE) that is spread in frequency and time domains. Here, the resource element refers to a unit resource that is composed of one OFDM symbols (time component) and one subcarrier (frequency component); for example, in a frequency domain within the same OFDM symbol, the REG is composed of four downlink resource elements contiguous in the frequency domain, other than a downlink pilot channel. For example, one PDCCH is composed of 1, 2, 4 or 8 CCEs in which numbers (CCE indices) for identification of CCEs are contiguous.

For each of the mobile station apparatuses and each of types, the PDCCH is individually subjected to coding (separate coding). In other words, the mobile station apparatus detects a plurality of PDCCHs, and acquires information indicating the downlink or uplink resource assignment and other control signals. The value of a CRC (cyclical redundancy check) that can identify a format is provided to each PDCCH; the mobile station apparatus performs the CRC on each of a set of CCEs that can constitute the PDCCH, and acquires the PDCCH in which the CRC has been successful. This is also referred to as blind decoding; the range of a set of CCEs on which the mobile station apparatus performs the blind decoding and which can constitute the PDCCH is also referred to as a search space. In other words, the mobile station apparatus performs the blind decoding on CCEs in the search space to detect the PDCCH.

When the PDCCH is used for indicating the resource assignment of the physical downlink shared channel (PDCCH), the mobile station apparatus receives, according to the resource assignment indicated by the PDCCH from the base station apparatus, using the physical downlink shared channel (PDSCH), data (downlink data (downlink shared channel (DL-SCH)) and/or downlink control data (downlink control information). In other words, this PDCCH is used for transmitting a signal (hereinafter referred to as a "downlink transmission permission signal" or a "downlink grant") for performing resource assignment on the downlink. When the PDCCH is used for indicating the resource assignment of the physical uplink shared channel (PUSCH), the mobile station apparatus transmits, according to the resource assignment indicated by the PDCCH from the base station apparatus, using the physical uplink shared channel (PUSCH), data (uplink data (uplink shared channel (UL-SCH)) and/or uplink control data (uplink control information). In other words, this PDCCH is used for transmitting a signal (hereinafter referred to as an "uplink transmission permission signal" or an "uplink grant") for permitting data transmission for the uplink.

The physical downlink shared channel (PDSCH) is a channel used for transmitting the downlink data (down link shared channel: DL-SCH) or paging information (paging channel: PCH). The physical multicast channel (PMCH) is a channel utilized for transmitting a multicast channel (MCH); a downlink reference signal, an uplink reference signal and a physical downlink synchronization signal are allocated separately.

Here, the downlink data (DL-SCH) refers to, for example, the transmission of user data; the DL-SCH is a transport channel. In the DL-SCH, the HARQ and dynamic adaptation radio link control are supported, and beam forming can be utilized. In the DL-SCH, dynamic resource assignment and semi-static resource assignment are supported.

The physical uplink shared channel (PUSCH) is a channel used for mainly transmitting uplink data (uplink shared channel: UL-SCH). When the base station apparatus performs scheduling on the mobile station apparatus, the uplink control information (uplink control signal) is also transmitted using the PUSCH. This uplink control information includes: channel state information CSI (or channel statistical information) that indicates the channel state of the downlink; a downlink channel quality indicator CQI; a precoding matrix indicator PMI; a rank indicator RI; and control information of HARQ for the PDCCH and/or downlink transport block (information indicating ACK/NACK and/or information indicating DTX).

Here, the uplink data (UL-SCH) refers to, for example, the transmission of user data; the UL-SCH is a transport channel. In the UL-SCH, the HARQ and dynamic adaptation radio link control are supported, and beam forming can be utilized. In the UL-SCH, dynamic resource assignment and static resource assignment are supported.

In the uplink data (UL-SCH) and the downlink data (DL-SCH), a radio resource control signaling (hereinafter referred to as "RRC signaling") exchanged between the base station apparatus and the mobile station apparatus, a MAC (medium access control) control element and the like may be included.

The physical uplink control channel (PDCCH) is a channel used for transmitting uplink control information (uplink control signal). Here, for example, the uplink control information includes: the channel state information CSI that indicates the channel state of the downlink; the downlink channel quality indicator CQI; the precoding matrix indicator PMI; the rank indicator RI; a scheduling request (SR) for the mobile station apparatus to request resource assignment for transmitting the uplink data (requesting the transmission in the UL-SCH); and the control information of HARQ for the PDCCH and/or downlink transport block (information indicating ACK/NACK and/or information indicating DTX).

The physical control format indicator channel (PCFICH) is a channel utilized for the notification of the number of OFDM symbols used for the PDCCH to the mobile station apparatus; it is transmitted in each subframe. The physical hybrid ARQ indicator channel (PHICH) is a channel utilized for the transmission of ACK/NACK used on HARQ of the uplink data. The physical random access channel (PRACH) is a channel used for the transmission of a random access preamble, and has a guard time. As shown in FIG. 1, the mobile communication system of the present embodiment includes the base station apparatus 100 and the mobile station apparatuses 200 (200-1 to 200-3).

[Configuration of the Base Station Apparatus]

Figure 2:
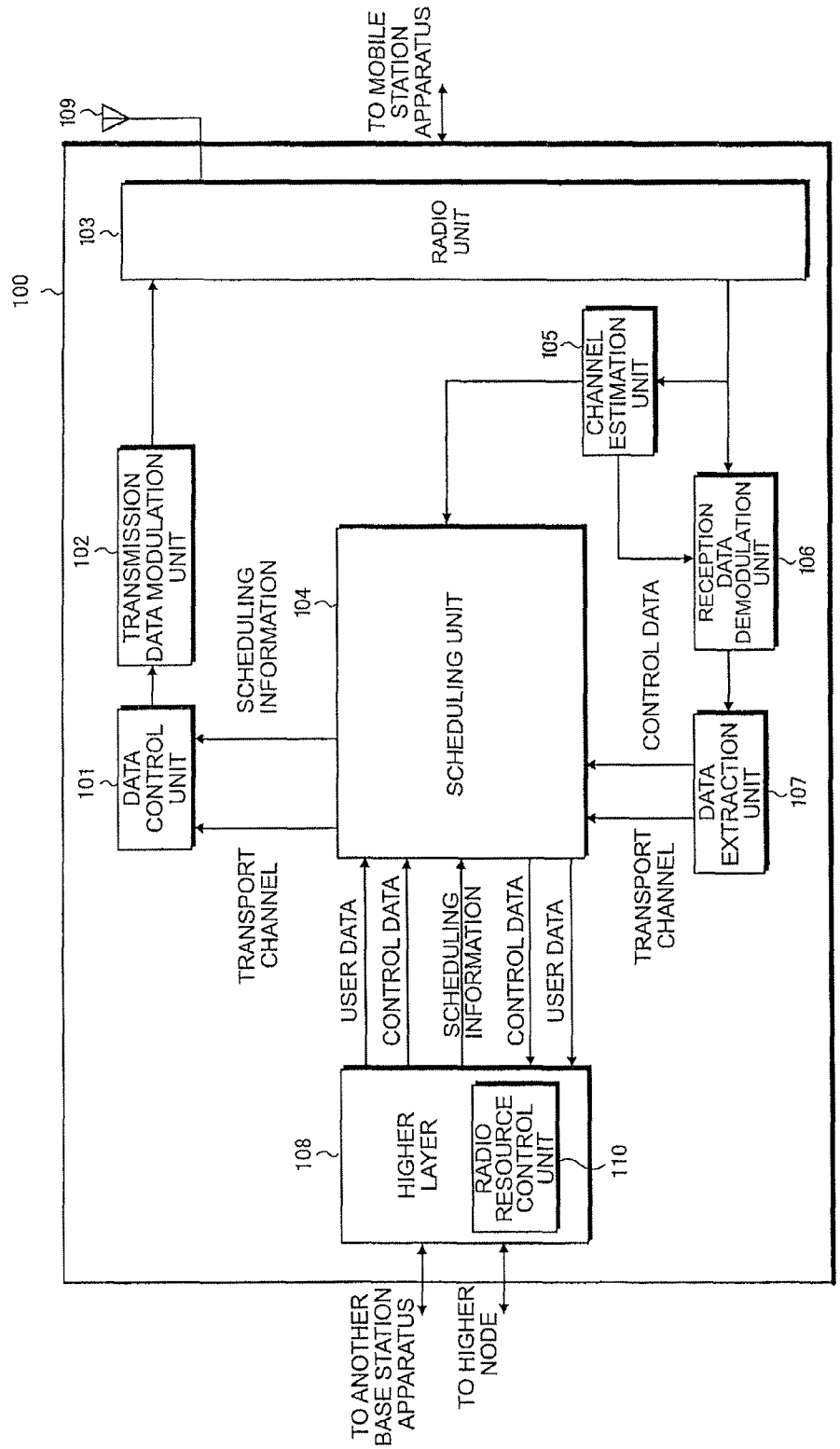
FIG. 2 is a block diagram showing a schematic configuration of abase station apparatus according to an embodiment of the present invention.

FIG. 2 is a block diagram showing a schematic configuration of the base station apparatus 100 according to the embodiment of the present invention. The base station apparatus 100 includes a data control portion 101, a transmission data modulation portion 102, a radio portion 103, a scheduling portion 104, a channel estimation portion 105, a reception data demodulation portion 106, a data extraction portion 107, an higher layer 108 and an antenna 109. The radio portion 103, the scheduling portion 104, the channel estimation portion 105, the reception data demodulation portion 106, the data extraction portion 107, the higher layer 108 and the antenna 109 constitute a reception portion; the data control portion 101, the transmission data modulation portion 102, the radio portion 103, the scheduling portion 104, the higher layer 108 and the antenna 109 constitute a transmission portion.

The antenna 109, the radio portion 103, the channel estimation portion 105, the reception data demodulation portion 106 and the data extraction portion 107 perform processing on an uplink physical layer. The antenna 109, the radio portion 103, the transmission data modulation portion 102 and the data control portion 101 perform processing on a downlink physical layer.

The data control portion 101 receives a transport channel from the scheduling portion 104. The data control portion 101 maps the transport channel and a signal and a channel generated in the physical layer on the physical channel based on scheduling information input from the scheduling portion 104. Each piece of data mapped as described above is output to the transmission data modulation portion 102.

The transmission data modulation portion 102 modulates the transmission data into an OFDM system. The transmission data modulation portion 102 performs, on the data input from the data control portion 101, based on the scheduling information from the scheduling portion 104 and a modulation scheme and a coding scheme corresponding to each PRB, signal processing such as data modulation, coding, serial/parallel conversion of the input signal, IFFT (inverse fast Fourier transform) processing, CP (cyclic prefix) insertion and filtering, generates the transmission data and outputs it to the radio portion 103. Here, the scheduling information includes downlink physical resource block PRB assignment information such as physical resource block position information composed of frequency and time; the modulation scheme and the coding scheme corresponding to each PRB include information such as the modulation scheme: 16 QAM and the coding rate: a 2/3 coding rate.

The radio portion 103 upconverts the modulation data input from the transmission data modulation portion 102 into radio frequency to generate a radio signal, and transmits it to the mobile station apparatus 200 through the antenna 109. The radio portion 103 also receives the uplink radio signal from the mobile station apparatus 200 through the antenna 109, and downconverts it into a base band signal and outputs the reception data to the channel estimation portion 105 and the reception data demodulation portion 106.

The scheduling portion 104 performs processing on a medium access control (MAC) layer. The scheduling portion 104 performs mapping on a logical channel and a transport channel, scheduling on the downlink and the uplink (such as the HARQ processing and the selection of a transport format) and the like. In order for the processing portions of the individual physical layers to be integrally controlled, in the scheduling portion 104, interfaces (not shown) are present between the scheduling portion 104 and the antenna 109, the radio portion 103, the channel estimation portion 105, the reception data demodulation portion 106, the data control portion 101, the transmission data modulation portion 102 and the data extraction portion 107.

In the downlink scheduling, based on feedback information (such as uplink channel state information (CSI, CQI, PMI, RI) and ACK/NACK information for the downlink data) received from the mobile station apparatus 200, available information on the PRB of each mobile station apparatus 200, buffer conditions, scheduling information input from the higher layer 108 and the like, the scheduling portion 104 performs selection processing on a downlink transport format for modulating each piece of data (such as a transmission form, that is, the assignment of a physical resource block and the modulation scheme, the coding scheme and the like), retransmitting control on HARQ and the generation of the scheduling information used in the downlink. The scheduling information used in the scheduling of the downlink is output to the data control portion 101.

In the uplink scheduling, based on the result of the estimation of the channel state (a radio channel state) of the uplink output by the channel estimation portion 105, the request of the resource assignment from the mobile station apparatus 200, available information on the PRB of each mobile station apparatus 200, the scheduling information input from the higher layer 108 and the like, the scheduling portion 104 performs selection processing on an uplink transport format for modulating each piece of data (such as a transmission form, that is, the assignment of a physical resource block and the modulation scheme, the coding scheme and the like) and the generation of the scheduling information used in the uplink scheduling. The scheduling information used in the uplink scheduling is output to the data control portion 101.

Moreover, the scheduling portion 104 maps the downlink logical channel input from the higher layer 108 on the transport channel, and outputs it to the data control portion 101. Furthermore, the scheduling portion 104 processes, as necessary, control data input from the data extraction portion 107 and acquired in the uplink and the transport channel, and then maps them on the uplink logical channel and outputs them to the higher layer 108.

In order to demodulate the uplink data, the channel estimation portion 105 estimates the channel state of the uplink from uplink demodulation reference signal (DRS), and outputs the result of the estimation to the reception data demodulation portion 106. Furthermore, in order to perform the uplink scheduling, the channel estimation portion 105 estimates the channel state of the uplink from uplink measurement reference signal (SRS: sounding reference signal), and outputs the result of the estimation to the scheduling portion 104.

The reception data demodulation portion 106 also serves as an OFDM demodulation portion and/or a DFT-Spread-OFDM (DFT-S-OFDM) demodulation portion that demodulates the reception data modulated into an OFDM system and/or a SC-FDMA system. Based on the result of the estimation of the channel state of the uplink input from the channel estimation portion 105, the reception data demodulation portion 106 performs, on the modulation data input from the radio portion 103, signal processing such as DFT conversion, subcarrier mapping, IFFT conversion and filtering, performs demodulation processing on it and outputs it to the data extraction portion 107.

The data extraction portion 107 checks whether the data input from the reception data demodulation portion 106 is correct or wrong, and outputs the result of the checking (positive signal ACK/negative signal NACK) to the scheduling portion 104. The data extraction portion 107 also separates the data input from the reception data demodulation portion 106 into the transport channel and control data on the physical layer, and outputs them to the scheduling portion 104. The separated control data includes: the channel state information CSI notified from the mobile station apparatus 200; the downlink channel quality indicator CQI; the precoding matrix indicator PMI; the rank indicator RI; the control information of HARQ and the scheduling request.

The higher layer 108 performs processing on a packet data convergence protocol (PDCP) layer, a radio link control (RLC) layer and a radio resource control (RRC) layer. In order for the processing portions of the lower layers to be integrally controlled, in the higher layer 108, interfaces (not shown) are present between the higher layer 108 and the scheduling portion 104, the antenna 109, the radio portion 103, the channel estimation portion 105, the reception data demodulation portion 106, the data control portion 101, the transmission data modulation portion 102 and the data extraction portion 107.

The higher layer 108 includes a radio resource control portion 110 (also referred to as a control portion). The radio resource control portion 110 performs management on various types of setting information, management on system information, paging control, management on the state of communication of each mobile station apparatus 200, movement management such as handover, management on the buffer conditions of each mobile station apparatus 200, management on the connection setting of unicast and multicast bearers, management on mobile station identifiers (UEID) and the like. The higher layer 108 exchanges information for another base station apparatus and information for an upper node.

[Configuration of the Mobile Station Apparatus 200]

Figure 3:
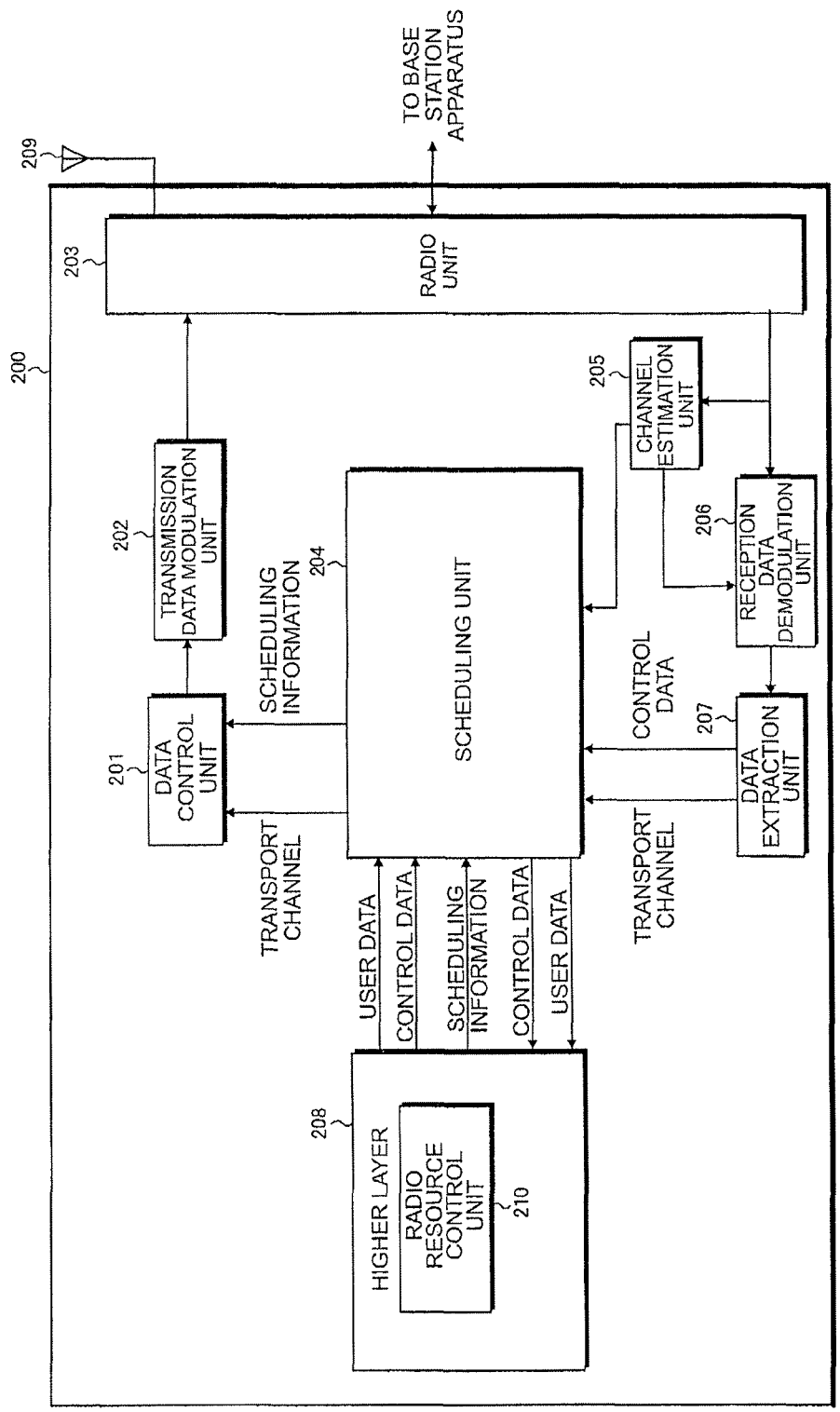
FIG. 3 is a block diagram showing a schematic configuration of a mobile station apparatus according to the embodiment of the present invention.

FIG. 3 is a block diagram showing a schematic configuration of the mobile station apparatus 200 according to the embodiment of the present invention. The mobile station apparatus 200 includes a data control portion 201, a transmission data modulation portion 202, a radio portion 203, a scheduling portion 204, a channel estimation portion 205, a reception data demodulation portion 206, a data extraction portion 207, an higher layer 208 and an antenna 209. The data control portion 201, the transmission data modulation portion 202, the radio portion 203, the scheduling portion 204, the higher layer 208 and the antenna 209 constitute a transmission portion; the radio portion 203, the scheduling portion 204, the channel estimation portion 205, the reception data demodulation portion 206, the data extraction portion 207, the higher layer 208 and the antenna 209 constitute a reception portion.

The data control portion 201, the transmission data modulation portion 202 and the radio portion 203 perform processing on an uplink physical layer. The radio portion 203, the channel estimation portion 205, the reception data demodulation portion 206 and the data extraction portion 207 perform processing on a downlink physical layer.

The data control portion 201 receives a transport channel from the scheduling portion 204. The data control portion 201 maps the transport channel and a signal and a channel generated in the physical layer on the physical channel based on scheduling information input from the scheduling portion 204. Each piece of data mapped as above is output to the transmission data modulation portion 202.

The transmission data modulation portion 202 modulates the transmission data into the OFDM system and/or the SC-FDMA system. The transmission data modulation portion 202 performs, on the data input from the data control portion 201, signal processing such as data modulation, DFT (discrete Fourier transform) processing, subcarrier mapping, IFFT (inverse fast Fourier transform) processing, CP insertion and filtering, generates the transmission data and outputs it to the radio portion 203.

The radio portion 203 upconverts the modulation data input from the transmission data modulation portion 202 into radio frequency to generate a radio signal, and transmits it to the base station apparatus 100 through the antenna 209. The radio portion 203 also receives, through the antenna 209, the radio signal modulated by the downlink data from the base station apparatus 100, and downconverts it into a base band signal and outputs the reception data to the channel estimation portion 205 and the reception data demodulation portion 206.

The scheduling portion 204 performs processing on a medium access control (MAC) layer. The scheduling portion 204 performs mapping between a logical channel and a transport channel, scheduling on the downlink and the uplink (such as the HARQ processing and the selection of a transport format) and the like. In order for the processing portions of the individual physical layers to be integrally controlled, in the scheduling portion 204, interfaces (not shown) are present between the scheduling portion 204 and the antenna 209, the data control portion 201, the transmission data modulation portion 202, the channel estimation portion 205, the reception data demodulation portion 206, the data extraction portion 207 and the radio portion 203.

In the downlink scheduling, based on the scheduling information (the transport format and the HARQ retransmission information) from the base station apparatus 100 and the higher layer 208 and the like, the scheduling portion 204 performs reception control on the transport channel and the physical signal and the physical channel and the generation of the scheduling information used on HARQ retransmission control and the downlink scheduling. The scheduling information used in the downlink scheduling is output to the data control portion 201.

In the uplink scheduling, based on the buffer conditions of the uplink input from the higher layer 208, the uplink scheduling information (the transport format, the HARQ retransmission information and the like) from the base station apparatus 100 input from the data extraction portion 207, the scheduling information input from the higher layer 208 and the like, the scheduling portion 204 performs scheduling processing for mapping the uplink logical channel input from the higher layer 208 on the transport channel and the generation of the scheduling information used in the uplink scheduling. With respect to the uplink transport format, information notified from the base station apparatus 100 is utilized. The scheduling information described above is output to the data control portion 201.

Moreover, the scheduling portion 204 maps the uplink logical channel input from the higher layer 208 on the transport channel, and outputs it to the data control portion 201. The scheduling portion 204 also outputs, to the data control portion 201, the downlink channel state information CSI input from the channel estimation portion 205, the downlink channel quality indicator CQI, the precoding matrix indicator PMI, the rank indicator RI and the result of the CRC check input from the data extraction portion 207. Furthermore, the scheduling portion 204 processes, as necessary, control data input from the data extraction portion 207 and acquired in the downlink and the transport channel, and then maps them on the downlink logical channel and outputs them to the higher layer 208.

In order to demodulate the downlink data, the channel estimation portion 205 estimates the channel state of the downlink from the downlink reference signal (RS), and outputs the result of the estimation to the reception data demodulation portion 206. In order to notify the base station apparatus 100 of the result of the estimation of the channel state (radio channel state) of the downlink, the channel estimation portion 205 estimates the channel state of the downlink from the downlink reference signal (RS), and outputs the result of the estimation to the scheduling portion 204 as the downlink channel state information CSI, the downlink channel quality indicator CQI, the precoding matrix indicator PMI and the rank indicator RI.

The reception data demodulation portion 206 demodulates the reception data modulated into the OFDM system. The reception data demodulation portion 206 performs, based on the result of the estimation of the channel state of the downlink input from the channel estimation portion 205, the demodulation processing on the modulation data input from the radio portion 203, and outputs it to the data extraction portion 207.

The data extraction portion 207 performs CRC check on the data input from the reception data demodulation portion 206, checks whether or not it is correct and outputs the result of the checking (positive acknowledgment ACK/negative acknowledgment NACK) to the scheduling portion 204. The data extraction portion 207 also separates the data input from the reception data demodulation portion 206 into the transport channel and control data on the physical layer, and outputs them to the scheduling portion 204. The separated control data includes the scheduling information such as the resource assignment of the downlink or the uplink and the HARQ control information on the uplink.

The higher layer 208 performs processing on a packet data convergence protocol (PDCP) layer, a radio link control (RLC) layer and a radio resource control (RRC) layer. In order for the processing portions of the lower layers to be integrally controlled, in the higher layer 208, interfaces (not shown) are present between the higher layer 208 and the scheduling portion 204, the antenna 209, the data control portion 201, the transmission data modulation portion 202, the channel estimation portion 205, the reception data demodulation portion 206, the data extraction portion 207 and the radio portion 203.

The higher layer 208 includes a radio resource control portion 210 (also referred to as a control portion). The radio resource control portion 210 performs management on various types of setting information, management on system information, paging control, management on the state of communication of the its station, movement management such as handover, management on the buffer conditions, management on the connection setting of unicast and multicast bearers and management on mobile station apparatus identifiers (UEID).

First Embodiment

A first embodiment of the mobile communication system using the base station apparatus 100 and the mobile station apparatuses 200 will now be described. In the first embodiment, the base station apparatus 100 semi-statically sets the first PUCCH to the mobile station apparatus 200, and dynamically sets the second PUCCH to the mobile station apparatus 200 in the same subframe as the subframe in which the first PUCCH is set; the mobile station apparatus 200 uses the first PUCCH and the second PUCCH, and thereby can transmit the control information of HARQ to the base station apparatus 100. The base station apparatus 100 semi-statically sets the first PUCCH to the mobile station apparatus 200, and dynamically sets the second PUCCH to the mobile station apparatus 200 in the same subframe as the subframe in which the first PUCCH is set; the mobile station apparatus 200 uses the first PUCCH or the second PUCCH, and thereby can transmit the control information of HARQ to the base station apparatus 100. Here, the mobile station apparatus 200 bundles (bunches or clumps) the control information of HARQ, and thereby can transmit it to the base station apparatus 100. The mobile station apparatus 200 also multiples (using a plurality of bits) the control information of HARQ, and thereby can transmit it to the base station apparatus 100. Here, the control information of HARQ (control signal of HARQ) transmitted by the mobile station apparatus 200 to the base station apparatus 100 refers to information (signal) indicating ACK/NACK for the PDCCH and/or the downlink transport block transmitted from the base station apparatus 100 and/or information (signal) indicating the DTX. The DTX refers to information (signal) indicating that the mobile station apparatus 200 cannot detect the PDCCH from the base station apparatus 100.

Although, in the following description of the first embodiment, a frequency band is defined as a bandwidth (Hz), it may be defined as the number of resource blocks (RB) composed of frequencies and times. In the present embodiment, a carrier element (hereinafter also referred to as a "carrier component," an "element carrier" or a "component carrier") refers to a (narrowband) frequency band aggregated when the base station apparatus 100 and the mobile station apparatus 200 performs communication using a broadband frequency band (it may be a system band). The base station apparatus 100 and the mobile station apparatus 200 aggregates a plurality of carrier elements to form a broadband frequency band, and use the carrier elements in a composite manner and thereby can realize high-speed data communication (the transmission and reception of information) (frequency band aggregation). For example, the base station apparatus 100 and the mobile station apparatus 200 aggregate five carrier elements each having a frequency width of 20 MHz to forma frequency band having a broadband frequency width of 100 MHz, and use the five carrier elements in a composite manner and thereby can perform communication.

The carrier element refers to each of (narrowband) frequency bands (for example, frequency bands each having a bandwidth of 20 MHz) constituting this broadband frequency band (for example, a frequency band having a bandwidth of 100 MHz). The carrier element also refers to each of (central) carrier frequencies of the (narrowband) frequency bands constituting this broadband frequency band. In other words, the downlink carrier element has a partial band (width) of the frequency band available when the base station apparatus 100 and the mobile station apparatus 200 transmit and receive the downlink information; the uplink carrier element has a partial band (width) of the frequency band available when the base station apparatus 100 and the mobile station apparatus 200 transmit and receive the uplink information. The carrier element may also be defined as a unit for constituting a specific physical channel (for example, the PDCCH, the PDSCH, the PUCCH or the PUSCH).

Here, the carrier element may be allocated in a contiguous frequency band or in a discontiguous frequency band; a plurality of carrier elements that are a contiguous and/or a discontiguous frequency band are aggregated, and thus it is possible to form a broadband frequency band. It is not necessary that a frequency band (which may be the DL system band or the DL system bandwidth) which is composed of the downlink carrier elements and which is used in the downlink communication be equal in the bandwidth to a frequency band (which may be the UL system band or the UL system bandwidth) which is composed of the uplink carrier elements and which is used in the uplink communication. Even if the frequency band used in the downlink communication is different in the bandwidth from the frequency band used in the uplink communication, the base station apparatus 100 and the mobile station apparatus 200 use the carrier elements in a composite manner and thereby can perform communication (asymmetric frequency band aggregation).

Figure 4:
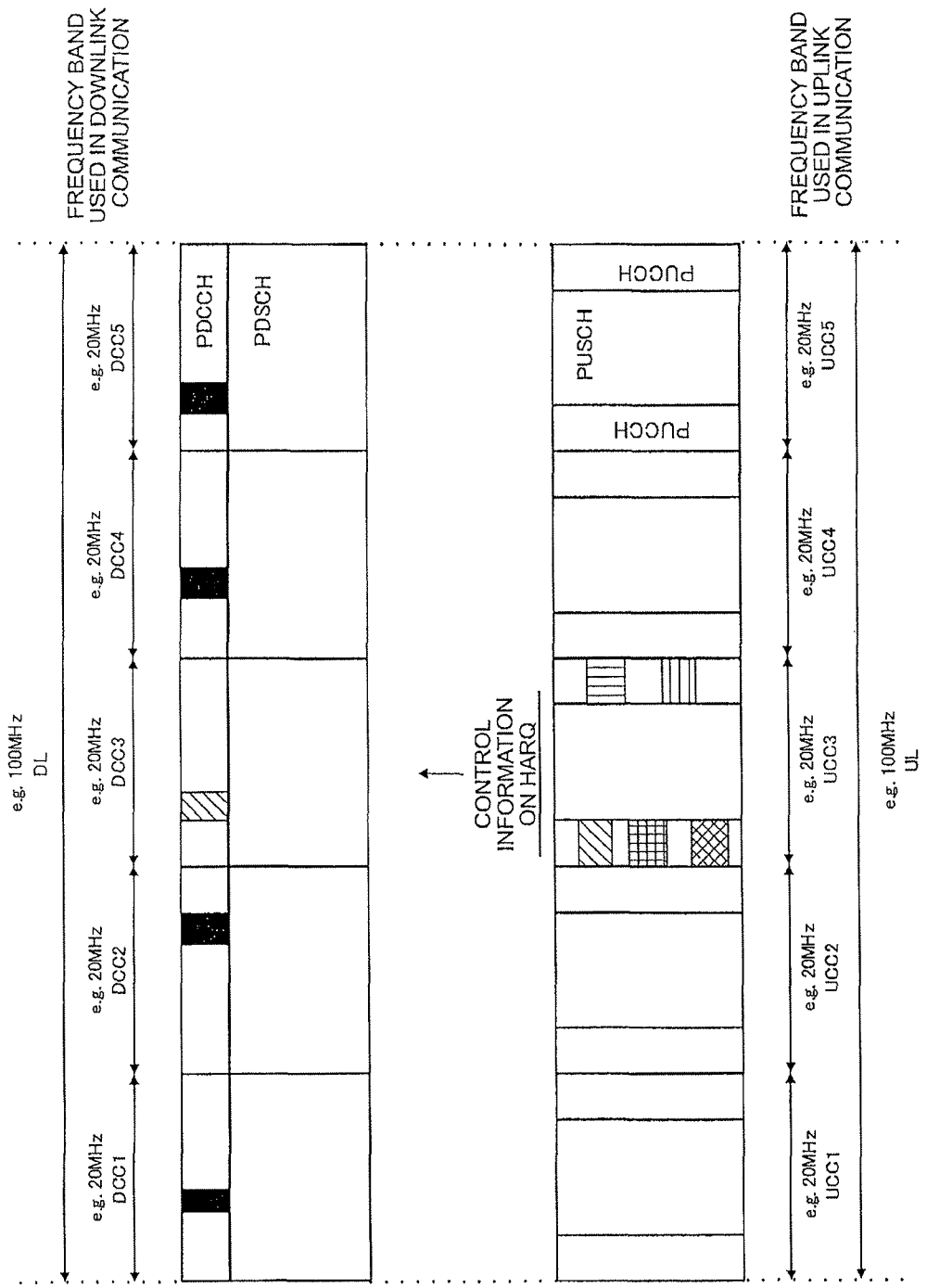
FIG. 4 is a diagram showing an example of a mobile communication system applicable to a first embodiment.

FIG. 4 is a diagram showing an example of the mobile communication system to which the first embodiment is applicable. FIG. 4 shows that, as an example illustrating the first embodiment, a frequency band having a bandwidth of 100 MHz and used in the downlink communication is composed of five downlink carrier elements (DCC1, DCC2, DCC3, DCC4 and DCC5), each having a bandwidth of 20 MHz. FIG. 4 also shows that a frequency band having a bandwidth of 100 MHz and used in the uplink communication is composed of five uplink carrier elements (UCC1, DCC2, UCC3, DCC4 and DCC5), each having a bandwidth of 20 MHz. In FIG. 4, on each of the downlink/uplink carrier elements, a downlink/uplink channel is mapped. Here, in FIG. 4, a downlink/uplink carrier element may be present on which any of downlink/uplink channels such as the PDCCH, the PDSCH, the PUCCH and the PUSCH is not mapped.

In FIG. 4, the base station apparatus 100 uses a plurality of PDCCHs on each of the downlink carrier elements, and thereby can set (allocate) a plurality of PDSCHs in the same subframe. For example, the base station apparatus 100 uses, on each of DCC1, DCC2, DCC3, DCC4 and DCC5, five PDCCHs (four PDCCHs indicated by black areas and one PDCCH indicated by oblique lines), and thereby can set the PDSCH on each of the DCC1, the DCC2, the DCC3, the DCC4 and the DCC5. Here, the base station apparatus 100 sets a plurality of PDCCHs on one carrier element in the downlink (using a plurality of PDCCHs, each PDCCH is coded separately), and thereby can also set a plurality of PDSCHs. For example, the base station apparatus 100 uses three PDCCHs set on the DCC3, and thereby can set three PDSCHs (for example, can set PDSCHs on the DCC1, the DCC2 an DCC4) in the same subframe.

Here, in order to use a plurality of PDCCHs set on one carrier element in the downlink and thereby set a plurality of PDSCHs, the base station apparatus 100 transmits component carrier identifier information (hereinafter also referred to "CII: carrier indicator information" or "CIF: carrier indicator field") on the PDCCHs. In other words, the base station apparatus 100 transmits the component carrier identifier information indicating which carrier element is used for transmission of the PDSCH on each of the PDCCH. For example, the base station apparatus 100 transmits, on each of three PDCCHs in the DCC3, component carrier identifier information indicating the setting of the PDSCH on the DCC1, component carrier identifier information indicating the setting of the PDSCH on the DCC2 and component carrier identifier information indicating the setting of the PDSCH on the DCC4.

Furthermore, the base station apparatus 100 uses a plurality of PDSCHs on each carrier element in the downlink, and thereby can transmit, in the same subframe, a plurality of downlink transport blocks to the mobile station apparatus 200. For example, the base station apparatus 100 uses five PDSCHs on the DCC1, the DCC2, the DCC3, the DCC4 and the DCC5, and thereby can transmit, in the same subframe, downlink transport blocks (up to five at the maximum) to the mobile station apparatus 200.

In FIG. 4, the mobile station apparatus 200 uses a plurality of PDSCHs on each carrier element in the uplink, and thereby can transmit, in the same subframe, a plurality of uplink transport blocks to the mobile station apparatus 200. For example, the mobile station apparatus 200 uses five PDSCHs on the UCC1, the UCC2, the UCC3, the UCC4 and the UCC5, and thereby can transmit, in the same subframe, uplink transport blocks (up to five at the maximum) to the base station apparatus 100.

Furthermore, in FIG. 4, the mobile station apparatus 200 can transmit, to the base station apparatus 100, the control information of HARQ for (a plurality of) PDCCHs and/or (a plurality of) downlink transport blocks transmitted from the base station apparatus 100. For example, the mobile station apparatus 200 can transmit, to the base station apparatus 100 in the same subframe, the control information of HARQ for five PDCCHs and/or five downlink transport blocks transmitted from the base station apparatus 100, using a plurality of PUCCHs (for example, five PUCCHs, that is, PUCCHs indicated by oblique lines, grid lines, mesh lines, vertical lines and horizontal lines). The mobile station apparatus 200 also bundles or multiplexes the control information of HARQ for the five PDCCHs and/or the five downlink transport blocks transmitted from the base station apparatus 100, and thereby can transmit it to the base station apparatus 100 using single PUCCH (for example, any one of the PUCCHs indicated by oblique lines, grid lines, mesh lines, vertical lines and horizontal lines).

Furthermore, the mobile station apparatus 200 partially bundles or multiplexes the control information of HARQ for the five PDCCHs and/or the five downlink transport blocks transmitted from the base station apparatus 100, and thereby can also transmit it to the base station apparatus 100. For example, the mobile station apparatus 200 partially bundles or multiplexes the control information of HARQ for PDCCHs and/or downlink transport blocks transmitted on the DCC1, the DCC2 and the DCC3. The mobile station apparatus 200 also partially bundles or multiplexes the control information of HARQ for PDCCHs and/or downlink transport blocks transmitted on the DCC4 and the DCC5. The mobile station apparatus 200 can also transmit, to the base station apparatus 100 in the same subframe, the control information of HARQ which has been partially bundled and multiplexed, using a plurality of PUCCHs (for example, two PUCCHs, that is, the PUCCHs indicated by oblique lines and grid lines).

Here, when the mobile station apparatus 200 bundles and transmits the control information of HARQ to the base station apparatus 100, one piece of control information of HARQ is calculated (generated) from the control information of HARQ for (a plurality of) PDCCHs and/or (a plurality of) downlink transport blocks, and the calculated one piece of control information of HARQ is transmitted to the base station apparatus 100. For example, the mobile station apparatus 200 calculates a logical OR or a logical AND on information (a plurality of pieces of control information of HARQ) indicating the DTX and/or the ACK/NACK for each of (the plurality of) PDCCHs and/or (the plurality of) downlink transport blocks, and can transmit the calculated control information (one piece of control information of HARQ) to the base station apparatus 100. For example, the mobile station apparatus 200 calculates a logical OR or a logical AND from information indicating the DTX and/or the ACK/NACK for each of PDCCHs and/or downlink transport blocks transmitted from the base station apparatus 100 on the DCC1, the DCC2, the DCC3, the DCC4 and the DCC5, and can transmit the calculated control information to the base station apparatus 100.

When the mobile station apparatus 200 multiplexes and transmits the control information of HARQ to the base station apparatus 100, the mobile station apparatus 200 transmits, to the base station apparatus 100, a plurality of pieces of control information expressing all the combinations of the control information of HARQ for each of (a plurality of) PDCCHs and/or (a plurality of) downlink transport blocks (not information necessary for expressing all the combinations but partial pieces of control information may be transmitted to the base station apparatus 100). For example, the mobile station apparatus 200 expresses, with a plurality of bits, combinations of information indicating the DTX and/or the ACK/NACK for each of (the plurality of) PDCCHs and/or (the plurality of) downlink transport blocks, and thereby can transmit them to the base station apparatus 100. For example, the mobile station apparatus 200 expresses, with a plurality of bits, combinations of information indicating the DTX and/or the ACK/NACK for each of PDCCHs and/or downlink transport blocks transmitted from the base station apparatus 100 on the DCC1, the DCC2, the DCC3, the DCC4 and the DCC5, and thereby can transmit them to the base station apparatus 100.

In FIG. 4, the base station apparatus 100 can set (specify) an uplink carrier element for the transmission of the control information of HARQ by the mobile station apparatus 200. For example, the base station apparatus 100 can semi-statically set, with the RRC signaling, the uplink carrier element for the transmission of the control information of HARQ by the mobile station apparatus 200. For example, the base station apparatus 100 can semi-statically set, with the RRC signaling, the uplink carrier element, where the PUCCH is mapped, for the transmission of the control information of HARQ by the mobile station apparatus 200. FIG. 4 shows an example where, as the uplink carrier element, where the PUCCH is mapped, for the transmission of the control information of HARQ by the mobile station apparatus 200, the base station apparatus 100 sets the UCC3. Here, as the uplink carrier element for the transmission of the control information of HARQ by the mobile station apparatus 200, the base station apparatus 100 can also set a plurality of uplink carrier elements.

In FIG. 4, the base station apparatus 100 sets (allocates), to the mobile station apparatus 200, the resources of (a plurality of) PDCCHs for the transmission of the control information of HARQ for (a plurality of) PDCCHs and/or (a plurality of) downlink transport blocks by the mobile station apparatus 200. In the following description of the present embodiment, for ease of the description, the PUCCH that is semi-statically set (allocated) by the base station apparatus 100 to the mobile station apparatus 200 is described as a first PUCCH, and the PUCCH that is dynamically set (allocated) by the base station apparatus 100 to the mobile station apparatus 200 is described as a second PUCCH. FIG. 4 shows that the base station apparatus 100 semi-statically sets the first PUCCHs (the PUCCHs indicated by grid lines, mesh lines, vertical lines and horizontal lines) to the mobile station apparatus 200, and dynamically sets the second PUCCH (the PUCCH indicated by oblique lines) to the mobile station apparatus 200 in the same subframe as the subframe in which the first PUCCHs are set.

In other words, for example, the base station apparatus 100 uses the RRC signaling, and thereby can set (allocate) the first PUCCHs (the PUCCHs indicated by grid lines, mesh lines, vertical lines and horizontal lines) to the mobile station apparatus 200. Here, the base station apparatus 100 links (corresponds) each of downlink carrier elements to each of resources of the first PUCCHs, and thereby can set them to the mobile station apparatus 200. FIG. 4 shows that the base station apparatus 100 links the DCC1 to the first PUCCH indicated by grid lines, the DCC2 to the first PUCCH indicated by mesh lines, the DCC4 to the first PUCCH indicated by vertical lines and the DCC5 to the first PUCCH indicated by horizontal lines, and sets the each of first PUCCHs to the mobile station apparatus 200. In other words, the base station apparatus 100 can semi-statically set (allocate) a set of first PUCCHs for the transmission of the control information of HARQ by the mobile station apparatus 200. Although, here, in FIG. 4, the base station apparatus 100 sets a set of four first PUCCHs to the mobile station apparatus 200, the base station apparatus 100 may set, as the set of first PUCCHs, any number of sets (the size (number) of first PUCCHs can be set). For example, the base station apparatus 100 can change the set (number) of first PUCCHs according to the ability of the mobile station apparatus 200 within a cell or the number of carrier elements when communication with the mobile station apparatus 200 is performed. For example, the base station apparatus 100 can set two first PUCCHs to the mobile station apparatus 200 when communication with the mobile station apparatus 200 is performed using three downlink carrier elements. The base station apparatus 100 can semi-statically set the first PUCCHs settable (where the size (number) of sets can be changed) for the mobile station apparatus 200.

Also, the base station apparatus 100 links (corresponds) PDSCHs transmitted on each of downlink carrier elements to each of resources of the first PUCCHs, and thereby can set them to the mobile station apparatus 200. For example, FIG. 4 shows that the base station apparatus 100 links the PDSCH transmitted on the DCC1 to the first PUCCH indicated by grid lines, the PDSCH transmitted on the DCC2 to the first PUCCH indicated by mesh lines, the PDSCH transmitted on the DCC4 to the first PUCCH indicated by vertical lines and the PDSCH transmitted on the DCC5 to the first PUCCH indicated by horizontal lines, and sets the each of first PUCCHs to the mobile station apparatus 200. Although, here, in FIG. 4, the base station apparatus 100 sets a set of four first PUCCHs to the mobile station apparatus 200, the base station apparatus 100 may set, as the set of first PUCCHs, any number of sets (the size (number) of first PUCCHs can be set).

Furthermore, for example, the base station apparatus 100 associates the second PUCCH which is used for transmitting the control information of HARQ (the PUCCH indicated by oblique lines) with the PDCCH which is used for assigning the PDSCH, and can dynamically set (allocate) it to the mobile station apparatus 200. For example, the base station apparatus 100 associates the second PUCCH with the position of the PDCCH (the PDCCH indicated by oblique lines) in a PDCCH resource region (PDCCH resource), the PDCCH is set on the downlink carrier element, and can dynamically set second PUCCH to the mobile station apparatus 200. In other words, the base station apparatus 100 associates the second PUCCH with on which the position of the PDCCH is set, in the PDCCH resource, and can instruct the mobile station apparatus 200 to transmit the control information of HARQ using the second PUCCH allocated in which position of the PUCCH resource region (PUCCH resource). Here, the PUCCH resource region can be set cell-specifically, for example, the base station apparatus 100, using the broadcast channel (broadcast information). The PUCCH resource region can also be set the mobile station apparatus-specifically, for example, the base station apparatus 100, using the RRC signaling.

In other words, the mobile station apparatus 200 maps, according to how the PDCCH is set in the PDCCH region, the control information of HARQ on the second PUCCH in the PUCCH region, and can transmit it to the base station apparatus 100. Here, the correspondence between the PDCCH set on the downlink carrier element and the second PUCCH set on the uplink carrier element is specified by, for example, making the first CCE index of the CCEs constituting the PDCCH correspond with the index of the second PUCCH (FIG. 4 shows that the first CCE index of the CCEs constituting the PDCCH indicated by oblique lines with the index of the second PUCCH indicated by oblique lines).

Moreover, the base station apparatus 100 can cell-specifically set the linking (correspondence) between each of the downlink carrier elements where the PDCCH is set and one uplink carrier element where the second PUCCH is set, using the broadcast information (broadcast channel). Furthermore, the base station apparatus 100 can the mobile station apparatus-specifically set the linking (correspondence) between each of the downlink carrier elements where the PDCCH is set and one uplink carrier element where the second PUCCH is set, using the RRC signaling. FIG. 4 shows that the base station apparatus 100 uses the broadcast information or the RRC signaling, and thereby links the DCC3 and the UCC3. For example, in FIG. 4, when the base station apparatus 100 links the DCC2 and the UCC3, the base station apparatus 100 associates the second PUCCH with the position of the PDCCH in the PDCCH resource region, the PDCCH is set on the DCC2, and sets the second PUCCH on the UCC3.

In other words, the second PUCCH dynamically set by the base station apparatus 100 is associated only between the downlink carrier element and the uplink carrier element linked by the broadcast information or the RRC signaling. Although, here, in FIG. 4, the base station apparatus 100 links only one downlink carrier element (DCC3) and one uplink carrier element (UCC3), the base station apparatus 100 can also link a plurality of downlink carrier elements and a plurality of uplink carrier elements. For example, in FIG. 4, the base station apparatus 100 can link the DCC2 and the UCC2, and link the DCC3 and the UCC4. In this case, the PDCCH set on the downlink carrier element and the second PUCCH set on the uplink carrier element are associated only between the downlink carrier element and the uplink carrier element linked together (the DCC2 and the UCC2, and the DCC3 and the UCC4).

In FIG. 4, the base station apparatus 100 uses the RRC signaling, and thereby semi-statically sets (allocates) the first PUCCHs (the PUCCHs indicated by grid lines, mesh lines, vertical lines and horizontal lines) to the mobile station apparatus 200, and dynamically sets the second PUCCH (the PUCCH indicated by oblique lines) to the mobile station apparatus 200 in the same subframe as the subframe in which the first PUCCH is allocated. As described above, the mobile station apparatus 200 transmits, to the base station apparatus 100, the control information of HARQ for (a plurality of) PDCCHs and/or (a plurality of) downlink transport blocks, using a plurality of PUCCHs or single PUCCH. In other words, the mobile station apparatus 200 uses the first PUCCH and the second PUCCH set by the base station apparatus 100, and thereby can transmit the control information of HARQ to the base station apparatus 100. The mobile station apparatus 200 also uses the first PUCCH or the second PUCCH allocated by the base station apparatus 100, and thereby can transmit the control information of HARQ to the base station apparatus 100. In this case, the mobile station apparatus 200 bundles the control information of HARQ, and can transmit it to the base station apparatus 100. The mobile station apparatus 200 also multiplexes the control information of HARQ, and can transmit it to the base station apparatus 100.

The first PUCCH that is semi-statically set by the base station apparatus 100 to the mobile station apparatus 200 will be described. In FIG. 4, the base station apparatus 100 can apply group scheduling to the first PUCCHs (the PUCCHs indicated by grid lines, mesh lines, vertical lines and horizontal lines) semi-statically allocated using the RRC signaling. In other words, the base station apparatus 100 can set the first PUCCHs for a plurality of mobile station apparatuses 200, and can make the first PUCCHs shared by the mobile station apparatuses 200. FIG. 4 shows that the base station apparatus 100 applies the group scheduling to the first PUCCHs indicated by grid lines, mesh lines, vertical lines and horizontal lines, and that the first PUCCHs are individually shared by the mobile station apparatuses 200. FIG. 4 shows that the second PUCCH dynamically set by the base station apparatus 100 is dynamically scheduled for a certain mobile station apparatus 200 (dynamic scheduling is applied).

Figure 5:
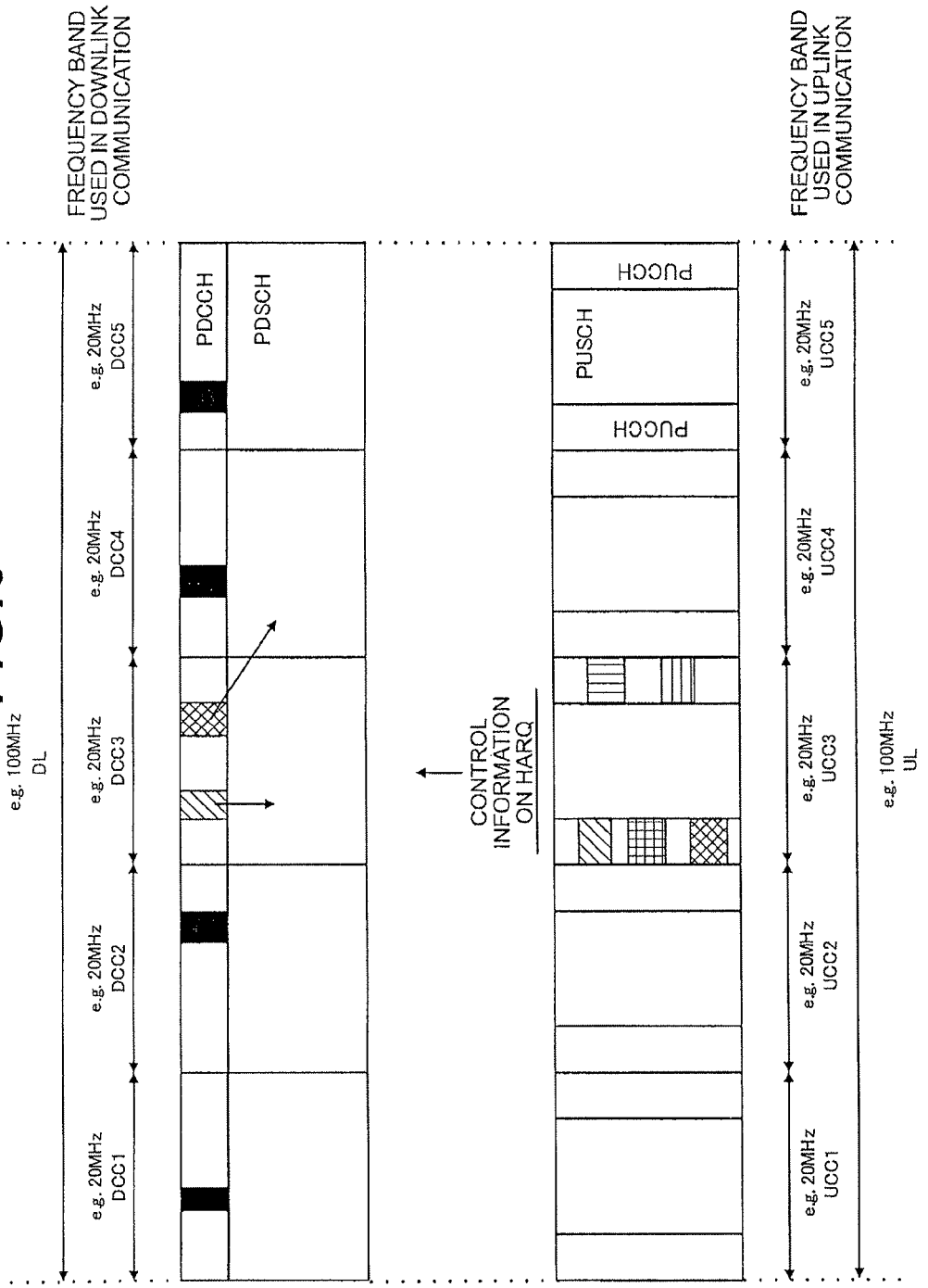
FIG. 5 is a diagram showing another example of the mobile communication system applicable to the first embodiment.

Likewise, FIG. 5 is a diagram showing another example of the mobile communication system to which the first embodiment is applicable. FIG. 5 shows that a frequency band having a bandwidth of 100 MHz and used in the downlink communication is composed of five downlink carrier elements (DCC1, DCC2, DCC3, DCC4 and DCC5), each having a bandwidth of 20 MHz. FIG. 5 also shows that a frequency band having a bandwidth of 100 MHz and used in the uplink communication is composed of five uplink carrier elements (UCC1, UCC2, UCC3, DCC4 and UCC5), each having a bandwidth of 20 MHz.

FIG. 5 differs from FIG. 4 in that the base station apparatus 100 uses a plurality of PDCCHs (the PDCCHs indicated by oblique lines and mesh lines) on one downlink carrier element (DCC3), and sets (allocates) a plurality of PDSCHs. As described above, the base station apparatus 100 transmits the component carrier identifier information on each of the PDCCHs in the one downlink carrier element, and thereby can set (allocate) the same downlink carrier element as the downlink carrier element transmitting the PDCCH or the PDSCHs allocated indifferent downlink carrier elements. FIG. 5 shows an example where the base station apparatus 100 transmits a plurality of PDCCHs (the PDCCHs indicated by oblique lines and mesh lines) on the DCC3 and sets the PDSCH of each of the DCC3 and the DCC4.

In FIG. 5, the base station apparatus 100 sets (allocates) the resources of (a plurality of) PUCCHs for the transmission of the control information of HARQ for (a plurality of) PDCCHs and/or (a plurality of) downlink transport blocks by the mobile station apparatus 200. FIG. 5 shows that the base station apparatus 100 semi-statically sets the first PUCCHs (the PUCCHs indicated by grid lines, vertical lines and horizontal lines) to the mobile station apparatus 200, and dynamically sets the second PUCCH (the PUCCHs indicated by oblique lines and mesh lines) to the mobile station apparatus 200 in the same subframe as the subframe in which the first PUCCH are set.

In other words, in FIG. 5, the base station apparatus 100 uses the RRC signaling, and thereby can semi-statically set the first PUCCHs (the PUCCHs indicated by grid lines, vertical lines and horizontal lines) to the mobile station apparatus 200. Here, the base station apparatus 100 links (corresponds) each of downlink carrier elements to each of resources of the first PUCCHs, and thereby can set them to the mobile station apparatus 200. FIG. 5 shows an example where the base station apparatus 100 links the DCC1 to the first PUCCH indicated by grid lines, the DCC2 to the first PUCCH indicated by vertical lines and the DCC5 to the first PUCCH indicated by horizontal lines, and sets each of first PUCCHs to the mobile station apparatus 200. Here, as described above, the base station apparatus 100 semi-statically can set (allocate) a set of first PUCCHs for the transmission of the control information of HARQ by the mobile station apparatus 200. Although, in FIG. 5, the base station apparatus 100 sets a set of three first PUCCHs to the mobile station apparatus 200, the base station apparatus 100 may set, as the set of first PUCCHs, any number of sets (the size (number) of the sets of the first PUCCHs can be set). The base station apparatus 100 can semi-statically set the first PUCCHs settable (where the size (number) of sets can be changed) to the mobile station apparatus 200.

The base station apparatus 100 associates the second PUCCH (the PUCCHs indicated by oblique lines and mesh lines) with the PDCCH, and can dynamically set (allocate) it to the mobile station apparatus 200. In other words, the base station apparatus 100 can set, with each of a plurality of PDCCHs (the PDCCHs indicated by oblique lines and mesh lines) transmitted on the DCC3, a plurality of second PUCCH (the PUCCHs indicated by oblique lines and mesh lines) allocated on the DCC3. FIG. 5 shows that the base station apparatus 100 associates the second PUCCH indicated by oblique lines with the PDCCH indicated by oblique lines, and dynamically sets the second PUCCH to the mobile station apparatus 200, and that the base station apparatus 100 associates the second PUCCH indicated by mesh lines with the PDCCH indicated by mesh lines, and dynamically sets the second PUCCH to the mobile station apparatus 200.

Here, the base station apparatus 100 uses the broadcast information or the RRC signaling, and thereby links (makes a is set and the uplink carrier element where the second PUCCH is set. Specifically, in FIG. 5 the base station apparatus 100 links the DCC3 and the UCC3, associates a plurality of second PUCCHs (the PUCCHs indicated by oblique lines and mesh lines) set on the UCC3 with the position of each of a plurality of PDCCHs (the PDCCHs indicated by oblique lines and mesh lines) in the PDCCH region, the each of a plurality of PDCCHs are allocated on the DCC3, and can set each of the second PUCCHs. In other words, in one of the downlink carrier elements and one of the uplink carrier elements linked by the broadcast information or the RRC signaling from the base station apparatus 100, a plurality of PDCCHs which is used for assigning the a plurality of PDSCHs and a plurality of PUCCHs which is used for transmitting the control information of HARQ are dynamically associated with each other.

As described above, the mobile station apparatus 200 transmits, to the base station apparatus 100, the control information of HARQ for (a plurality of) PDCCHs and/or (a plurality of) downlink transport blocks, using a plurality of PUCCHs or single PUCCH. In other words, the mobile station apparatus 200 uses the first PUCCH and the second PUCCH allocated by the base station apparatus 100, and thereby can transmit the control information of HARQ to the base station apparatus 100. The mobile station apparatus 200 also uses the first PUCCH or the second PUCCH allocated by the base station apparatus 100, and thereby can transmit the control information of HARQ to the base station apparatus 100. In this case, the mobile station apparatus 200 bundles the control information of HARQ, and transmits it to the base station apparatus 100. The mobile station apparatus 200 also multiplexes the control information of HARQ, and transmits it to the base station apparatus 100.

As in the description of FIG. 4, in FIG. 5, the base station apparatus 100 can apply the group scheduling to the first PUCCHs (the PUCCHs indicated by grid lines, vertical lines and horizontal lines) semi-statically allocated using the RRC signaling. In other words, the base station apparatus 100 can set the first PUCCHs for a plurality of mobile station apparatuses 200, and can make the first PUCCHs shared by the mobile station apparatuses 200. FIG. 5 shows that the base station apparatus 100 applies the group scheduling to the first PUCCHs indicated by grid lines, vertical lines and horizontal lines, and that the first PUCCHs are individually shared by the mobile station apparatuses 200. FIG. 5 shows that the second PUCCHs (the PUCCHs indicated by oblique lines and mesh lines) dynamically set by the base station apparatus 100 is dynamically scheduled for a certain mobile station apparatus 200 (the dynamic scheduling is applied).

As described above, in the first embodiment, since the mobile station apparatus 200 transmits the control information of HARQ, the base station apparatus 100 semi-statically can set the first PUCCH to the mobile station apparatus 200, and dynamically set the second PUCCH to the mobile station apparatus 200 in the same subframe as the subframe in which the first PUCCH is allocated. The mobile station apparatus 200 also uses the first PUCCH and/or the second PUCCH set by the base station apparatus 100, and thereby can transmit the control information of HARQ to the base station apparatus 100. In this case, the mobile station apparatus 200 bundles the control information of HARQ, and transmits it to the base station apparatus 100. The mobile station apparatus 200 also multiplexes the control information of HARQ, and transmits it to the base station apparatus 100.

The base station apparatus 100 and the mobile station apparatus 200 transmit and receive the control information of HARQ as described above, and thus the base station apparatus 100 can semi-statically set the first PUCCH for each of the mobile station apparatuses 200, and the base station apparatus 100 can change (modify) the (number of) first PUCCHs that are set for each of the mobile station apparatuses 200 according to, for example, the number of carrier elements used in the communication and the conditions of radio resources within the cell. The base station apparatus 100 changes (modifies) the first PUCCHs that are semi-statically allocated for each of the mobile station apparatuses 200, and thus it is possible to effectively allocate the resources of the uplink and to effectively use the radio resources.

The base station apparatus 100 applies the group scheduling when sets the first PUCCH, and thus, even if the mobile station apparatus 200 does not use the first PUCCH (for example, the mobile station apparatus 200 uses only one downlink/uplink carrier element to communicate with the base station apparatus 100), it is possible to set the first PUCCH for other mobile station apparatuses and effectively use the resources of the uplink. Furthermore, the base station apparatus 100 associates the second PUCCH allocated on the carrier element of the uplink with the position of the PDCCH allocated in the carrier element of the downlink, and dynamically sets the second PUCCH, and thus it is possible to effectively set the second PUCCH for the mobile station apparatus 200.

The mobile station apparatus 200 bundles or multiplexes the control information of HARQ and transmits it to the base station apparatus 100, and thus it is possible to reduce transmit power in the mobile station apparatus 200 and transmit the control information of HARQ. The mobile station apparatus 200 uses any one of (a small number of) (a plurality of) PUCCHs set by the base station apparatus 100, and transmits the control information of HARQ, and thus it is possible to transmit the control information of HARQ while reducing the transmit power in the mobile station apparatus 200.

In other words, when the base station apparatus 100 and the mobile station apparatus 200 use a broadband frequency band of a plurality of carrier elements to perform communication, it is possible to effectively transmit and receive the control information of HARQ with consideration given to the method of setting the resource by the base station apparatus 100 and the transmit power in the mobile station apparatus 200. Here, although, in the first embodiment, the example of the operation of the base station apparatus 100 and the mobile station apparatus 200 in the mobile communication system that has been subjected to symmetric frequency band aggregation, it is naturally possible to apply the same method to the mobile communication system that has been subjected to the asymmetric frequency band aggregation.

Second Embodiment

The second embodiment of the present invention will now be described. In the second embodiment, the base station apparatus 100 semi-statically sets the first PUCCH to the mobile station apparatus 200, transmits, to the mobile station apparatus 200, information indicating activation and/or deactivation for the downlink component carrier and dynamically sets the second PUCCH to the mobile station apparatus 200 in the same subframe as the subframe in which the first PUCCH is allocated whereas the mobile station apparatus 200 uses the first PUCCH and/or the second PUCCH activated according to the information indicating the activation and/or the deactivation, and thereby can transmit the control information of HARQ to the base station apparatus 100. Moreover, the base station apparatus 100 semi-statically sets the first PUCCH to the mobile station apparatus 200, transmits, to the mobile station apparatus 200, information indicating the activation and/or the deactivation for the downlink component carrier and dynamically sets the second PUCCH to the mobile station apparatus 200 in the same subframe as the subframe in which the first PUCCH is allocated whereas the mobile station apparatus 200 uses the first PUCCH and/or the second PUCCH selected according to the information indicating the activation and/or the deactivation, and thereby can transmit the control information of HARQ to the base station apparatus 100. In this case, the mobile station apparatus 200 can bundle the control information of HARQ, and transmit to the base station apparatus 100. The mobile station apparatus 200 can also multiplex the control information of HARQ, and transmit it to the base station apparatus 100. In the second embodiment, the same operations of the base station apparatus 100 and the mobile station apparatus 200 shown in the first embodiment are applied.

Figure 6:
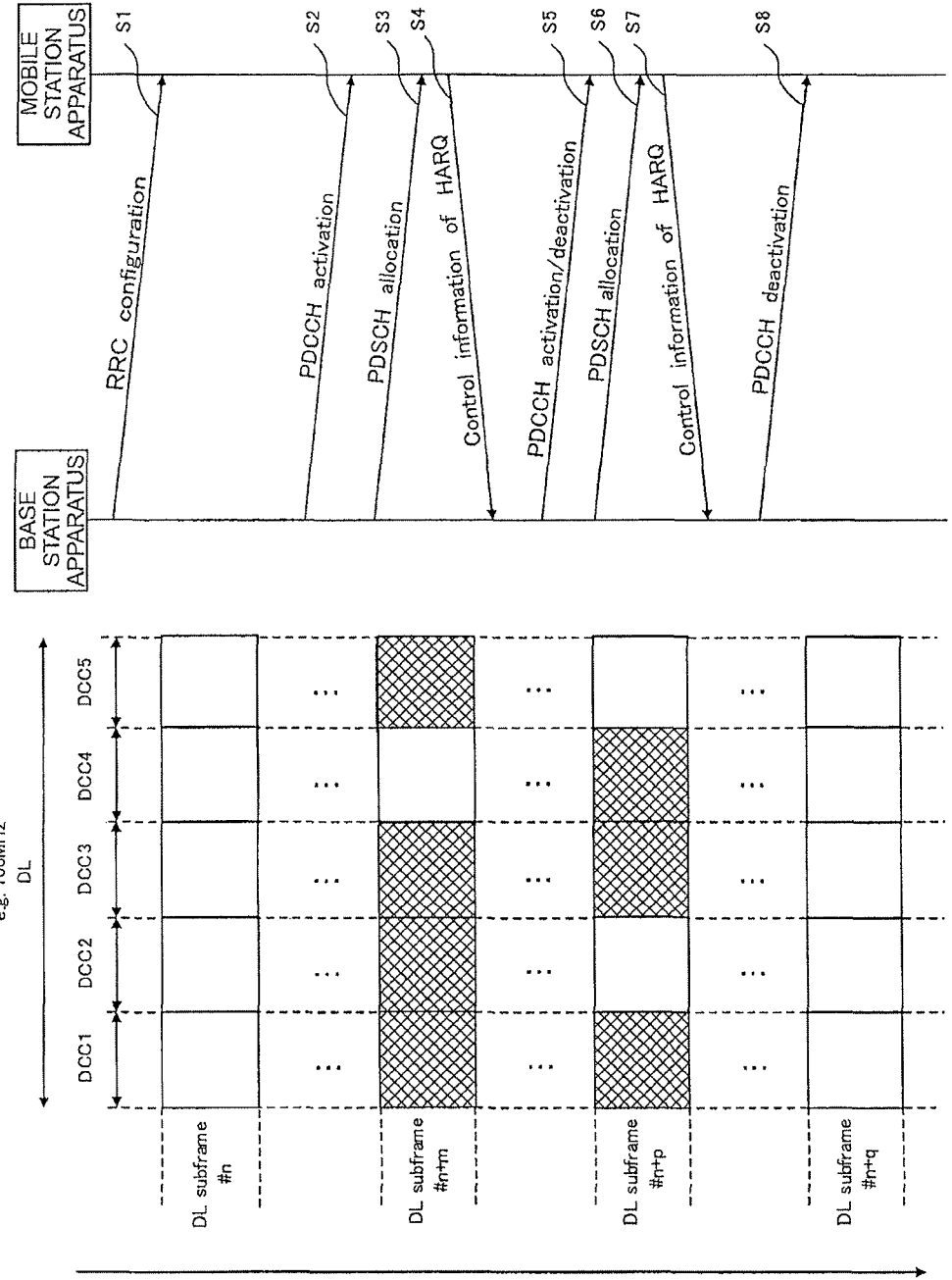
FIG. 6 is a diagram showing an example of a mobile communication system applicable to a second embodiment.
Figure 7:
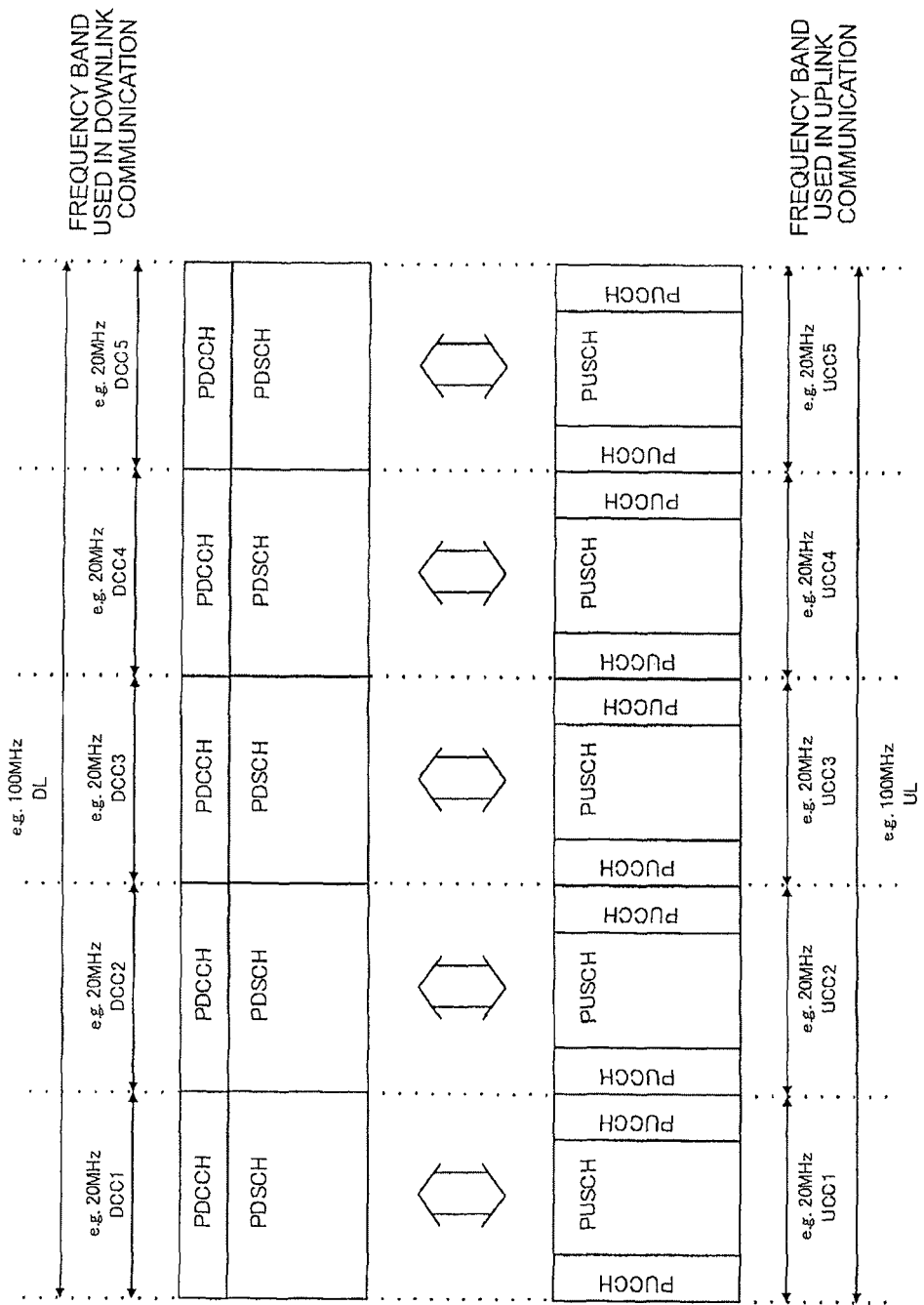
FIG. 7 is a diagram illustrating an example of a mobile communication system on which frequency band aggregation has been performed in a conventional technology.
Figure 8:
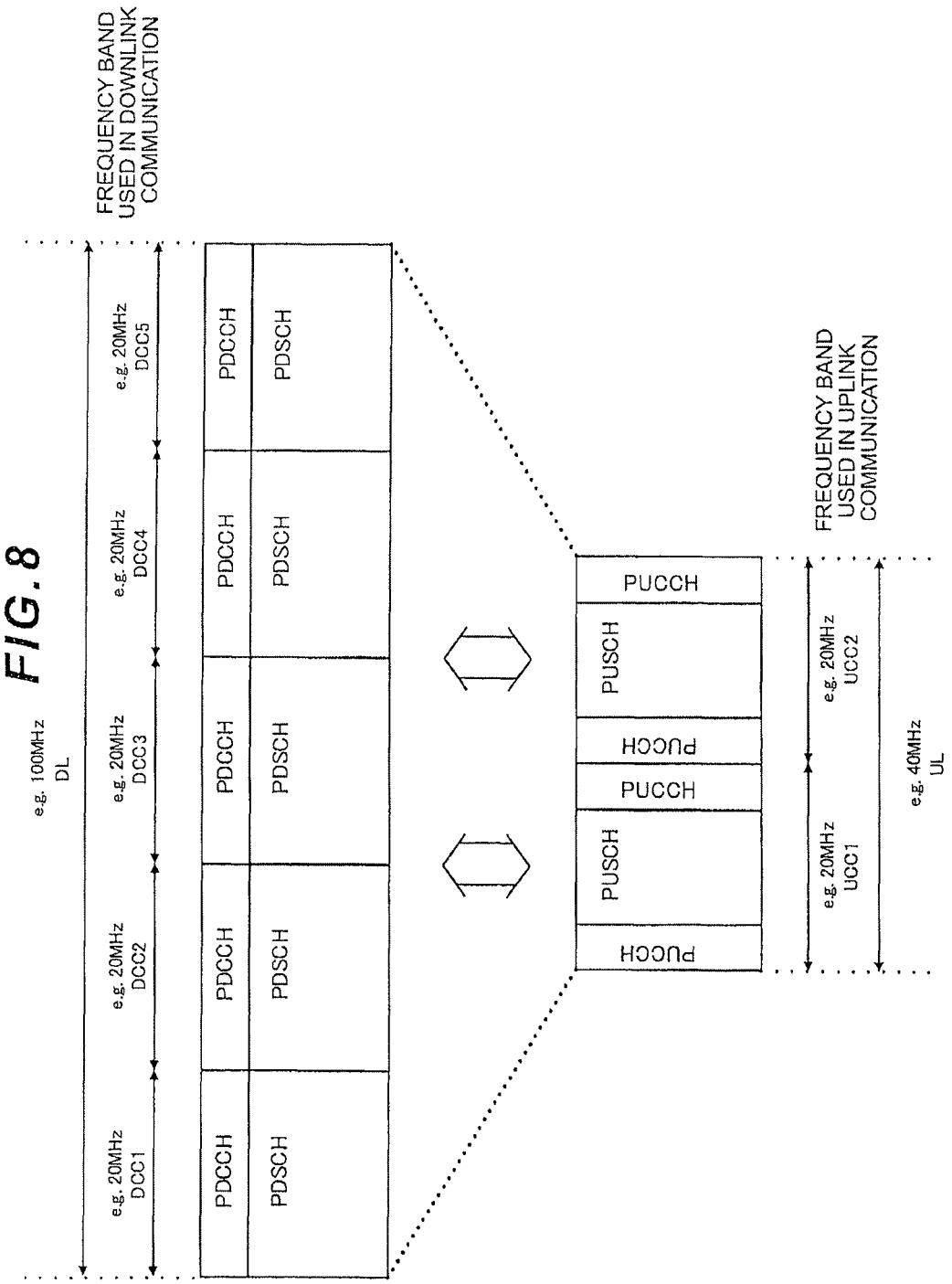
FIG. 8 is a diagram illustrating an example of a mobile communication system on which asymmetric frequency band aggregation has been performed in the conventional technology.

FIG. 6 is a diagram illustrating an example of the second embodiment. On the left side of FIG. 6, in a horizontal direction, it is shown that a frequency band having a bandwidth of 100 MHz and used in the communication of the downlink is composed of five downlink carrier elements (DCC1, DCC2, DCC3, DCC4 and DCC5). In a vertical direction, time (subframe) is shown; as an example, a downlink subframe #n, a downlink subframe #n+m, a downlink subframe #n+p and a downlink subframe #n+q are conceptually shown (the downlink subframe is hereinafter referred to as a subframe). On the right side of FIG. 6, the processing flow of the base station apparatus 100 and the mobile station apparatus 200 corresponding to the diagram on the left side is conceptually shown.

In FIG. 6, the base station apparatus 100 can set, for the mobile station apparatus 200, a set of downlink carrier elements that might be scheduled for the mobile station apparatus 200 to receive the PDSCH in the downlink. In the following description of the present embodiment, the set of carrier elements in the downlink is referred to a downlink carrier element set (DCC set: downlink component carrier set). For example, the base station apparatus 100 transmits, to the mobile station apparatus 200, the RRC signaling including information for adding and/or removing the downlink carrier elements, and can semi-statically set the DCC set (add and/or remove the downlink carrier elements). In other words, the base station apparatus 100 can set the DCC set for each of the mobile station apparatus 200 according to the conditions of radio resources within a cell to be controlled, the ability of each of the mobile station apparatuses 200 and the conditions of the transmission path of each of the mobile station apparatuses 200.

In FIG. 6, the subframe #n, the subframe #n+m, the subframe #n+p and the subframe #n+q indicate subframes in which the five downlink carrier elements (the DCC1, the DCC2, the DCC3, the DCC4 and the DCC5) are set as the DCC set. Although, in FIG. 6, as an example, the base station apparatus 100 sets the five downlink carrier elements as the DCC set, the base station apparatus 100 may set any number of downlink carrier elements as the DCC set.

Furthermore, in FIG. 6, the base station apparatus 100 transmits, to the mobile station apparatus 200, the information on the activation and/or the deactivation for the downlink carrier elements (the information indicating the activation and/or the deactivation), and can activate and/or deactivate the set of downlink carrier elements (which may be a set of downlink carrier elements that might be scheduled for receiving the PDSCH in the downlink). In the following description of the present embodiment, this set of carrier elements in the downlink is referred to a downlink carrier element activation set (DCC active set: downlink component carrier active set). Here, the DCC active set is set for the downlink carrier elements among the DCC set described above. The base station apparatus 100 can also set the DCC active set as the downlink carrier elements in which the mobile station apparatus 200 attempts to detect the PDCCH (to monitor the PDCCH).

In FIG. 6, the subframe #n indicates a subframe in which five downlink carrier elements (the DCC1, the DCC2, the DCC3, the DCC4 and the DCC5 indicated by being colored in white) are not activated (deactivated). The subframe #n+m indicates a subframe in which four downlink carrier elements (the DCC1, the DCC2, the DCC3 and the DCC5 indicated by mesh lines) are activated. Here, the subframe #n+m can be recognized to be a subframe in which, for the subframe #n, the DCC1, the DCC2, the DCC3 and the DCC5 are activated and the deactivation for the DCC4 is maintained. The subframe #n+P indicates a subframe in which three downlink carrier elements (the DCC1, the DCC3 and the DCC5 indicated by mesh lines) are activated. Here, the subframe #n+p can be recognized to be a subframe in which, for the subframe #n+m, the activation for the DCC1 and the DCC3 is maintained, the DCC2 and the DCC5 are deactivated and the DCC4 is activated. The subframe #n+q indicates a subframe in which five downlink carrier elements (the DCC1, the DCC2, the DCC3, the DCC4 and the DCC5 indicated by being colored in white) are deactivated (not activated). Here, the subframe #n+q can be recognized to be a subframe in which, for the subframe #n+p, the DCC1, the DCC3 and the DCC4 are deactivated and the deactivation for the DCC2 and DCC5 is maintained.

For example, the base station apparatus 100 transmits the information on the activation and/or the deactivation for the downlink carrier elements (the information indicating the activation and/or the deactivation) on the PDCCH, and can dynamically control (set, indicate) the DCC active set. Here, the base station apparatus 100 uses the PDCCH, and thereby can control the activation for the downlink carrier elements. The base station apparatus 100 also uses the PDCCH, and thereby can control the deactivation for the downlink carrier elements. Furthermore, the base station apparatus 100 uses the PDCCH, and thereby can control the activation and the deactivation for the downlink carrier elements in the same subframe (at the same timing). As described above, the base station apparatus 100 sets the DCC active set for the mobile station apparatus 200, and thus it is possible to save power consumption in the mobile station apparatus 200 (to reduce the number of DCCs where the PDCCH to be monitored by the mobile station apparatus 200 is allocated), and to achieve power saving in the mobile station apparatus 200.

Although, here, in the following description, the base station apparatus 100 uses the PDCCH to control the DCC active set, the base station apparatus 100 can use the RRC signaling and a MAC control element (the MAC signaling) and control the DCC active set. For example, the base station apparatus 100 may control the DCC active set by associating the DCC active set with discontiguous reception (DRX) in which control is performed using the MAC control element. The base station apparatus 100 uses the PDCCH to control the DCC active set, and thus it is possible to more dynamically (for example, at intervals of 1 ms) control the DCC active set, and to most enhance the effects on the power saving of the mobile station apparatus 200. On the other hand, the base station apparatus 100 uses the RRC signaling or the MAC control element to control the DCC active set, and thus it is possible to more reliably control the DCC active set.

The processing flow of the base station apparatus 100 and the mobile station apparatus 200 on the right side of FIG. 6 will be described. Before the subframe #n of FIG. 6, the base station apparatus 100 sets the five downlink carrier elements (the DCC1, the DCC2, the DCC3, the DCC4 and the DCC5) as the DCC set to the mobile station apparatus 200 (step S1). Before the subframe #n, in order for the mobile station apparatus 200 to transmit the control information of HARQ, the base station apparatus 100 notifies (transmits), to the mobile station apparatus 200, setting information (parameter) for semi-statically setting (a plurality of) first PUCCHs using the RRC signaling. For example, in order for the mobile station apparatus 200 to transmit the control information of HARQ, the base station apparatus 100 can notify, to the mobile station apparatus 200, information on four resources of the first PUCCHs using the RRC signaling.

In FIG. 6, for example, the base station apparatus 100 can notify, to the mobile station apparatus 200, setting information on the PUCCHs linked to each of the DCC1, the DCC2, the DCC4 and the DCC5 as the setting information of the first PUCCHs. Moreover, for example, the base station apparatus 100 can set the linking between the DCC3 and one uplink carrier element. In other words, the PUCCH set on one uplink carrier element linked to the DCC3 is associated, as the second PUCCH, with the PDCCH transmitted on the DCC3.

The subframe #n indicates a subframe in which the five downlink carrier elements (the DCC1, the DCC2, the DCC3, the DCC4 and the DCC5) set by the base station apparatus 100 as the DCC set are not activated. In other words, the subframe #n indicates a subframe in which the base station apparatus 100 does not set the DCC active set for the mobile station apparatus 200. In the subframe #n, the mobile station apparatus 200 releases the resources of the first PUCCHs in which the base station apparatus 100 notifies the setting information. Specifically, the mobile station apparatus 200 releases the resources of the first PUCCH linked to each of the DCC1, the DCC2, the DCC4 and the DCC5.

Between the subframe #n and the subframe #n+m. the base station apparatus 100 sets the four downlink carrier elements (the DCC1, the DCC2, the DCC3 and the DCC5) to the mobile station apparatus 200 as the DCC active set (step S2). In other words, the deactivation for the DCC 4 is maintained. Here, the mobile station apparatus 200 can activate the resources of the first PUCCHs according to the DCC active set that is set by the base station apparatus 100. Specifically, the mobile station apparatus 200 can activate, according to the DCC active set, the resources of the first PUCCH linked to each of the DCC1, the DCC2, and the DCC5. In other words, the resources of the first PUCCH linked to the DCC4 maintain the release (the mobile station apparatus 200 can maintain the release of the resources of the first PUCCH linked to the DCC4. Specifically, according to the DCC active set that is set by the base station apparatus 100, based on the setting information on the first PUCCHs notified by the base station apparatus 100, three first PUCCHs are semi-statically set (allocated) for the mobile station apparatus 200.

In the subframe #n+m, the base station apparatus 100 uses (a plurality of) PDCCHs to set (allocate) (a plurality of) PDSCHs to the mobile station apparatus 200 (step S3). The base station apparatus 100 also uses (a plurality of) PDSCHs to transmit, to the mobile station apparatus 200, (a plurality of) downlink transport blocks in the same subframe. For example, the base station apparatus 100 transmits the PDCCH on each of the four downlink carrier elements (the DCC1, the DCC2, the DCC3 and the DCC5) and sets four PDSCHs. The base station apparatus 100 also uses the four PDSCHs, and transmits, to the mobile station apparatus 200, the four downlink transport blocks in the same subframe. The base station apparatus 100 associates the second PUCCH with the PDCCH transmitted on the DCC3, and dynamically sets (allocates) the second PUCCH to the mobile station apparatus 200. In other words, the base station apparatus 100 sets the DCC active set, and thereby dynamically sets the second PUCCH to the mobile station apparatus 200 in the same subframe as (a plurality of) first PUCCHs semi-statically set.

In the uplink subframe corresponding to the subframe #n+m, the mobile station apparatus 200 transmits the control information of HARQ for (a plurality of) PDCCHs and/or (a plurality of) downlink transport blocks to the base station apparatus 100 (step S4). In other words, the mobile station apparatus 200 uses the three first PUCCHs activated (added, maintained) according to the DCC active set and/or the second PUCCH dynamically allocated, and thereby can transmit the control information of HARQ to the base station apparatus 100. In this case, the mobile station apparatus 200 bundles the control information of HARQ, and can transmit it to the base station apparatus 100. The mobile station apparatus 200 also multiplexes the control information of HARQ, and can transmit it to the base station apparatus 100.

Between the subframe #n+m and the subframe #n+p, the base station apparatus 100 sets the three downlink carrier elements (the DCC1, the DCC3 and the DCC4) to the mobile station apparatus 200 as the DCC active set (step S5). In other words, the base station apparatus 100 deactivates the two downlink carrier elements (the DCC2 and the DCC5). Here, the mobile station apparatus 200 can activate and release, according to the DCC active set by the base station apparatus 100, the resources of the first PUCCH. In other words, the mobile station apparatus 200 can activate, according to the DCC active set, the resources of the first PUCCHs linked to the DCC1 and the DCC4 (can maintain the activation for the resources of the first PUCCHs linked to the DCC1, and add the activation for the resources of the first PUCCHs linked to the DCC4). The mobile station apparatus 200 can also release the resources of the first PUCCHs linked to the DCC2 and the DCC5. Specifically, according to the DCC active set that is set by the base station apparatus 100, based on the setting information on the first PUCCHs notified by the base station apparatus 100, two first PUCCHs are semi-statically set (allocated) for the mobile station apparatus 200.

In the subframe #n+p, the base station apparatus 100 uses (a plurality of) PDCCHs to set (a plurality of) PDSCHs to the mobile station apparatus 200 (step S6). The base station apparatus 100 also uses (a plurality of) PDSCHs to transmit, to the mobile station apparatus 200, (a plurality of) downlink transport blocks in the same subframe. For example, the base station apparatus 100 transmits the PDCCH on each of the three activated downlink carrier elements (the DCC1, the DCC3 and the DCC4) and sets three PDSCHs. The base station apparatus 100 also uses the three PDSCHs, and transmits, to the mobile station apparatus 200, the three downlink transport blocks using the three PDSCHs. Furthermore, the base station apparatus 100 associates the second PUCCH with the PDCCH transmitted on the DCC3, and dynamically sets the second PUCCH to the mobile station apparatus 200.

In the uplink subframe corresponding to the subframe #n+p, the mobile station apparatus 200 transmits the control information of HARQ for (a plurality of) PDCCHs and/or (a plurality of) downlink transport blocks to the base station apparatus 100 (step S7). In other words, the mobile station apparatus 200 uses the two first PDCCHs activated (added, maintained) according to the DCC active set and/or the second PUCCH dynamically allocated, and thereby can transmit the control information of HARQ to the base station apparatus 100. In this case, the mobile station apparatus 200 bundles the control information of HARQ, and can transmit it to the base station apparatus 100. The mobile station apparatus 200 also multiplexes the control information of HARQ, and can transmit it to the base station apparatus 100.

Between the subframe #n+p and the subframe #n+q, the base station apparatus 100 deactivates the five downlink carrier elements (the DCC1, the DCC2, the DCC3, the DCC4 and the DCC5) (step S8). Here, the mobile station apparatus 200 can release the resources of the first PUCCH according to the DCC active set by the base station apparatus 100. In other words, the mobile station apparatus 200 releases, according to the DCC active set, the resources of the first PUCCHs linked to the DCC1, the DCC2, the DCC3, the DCC4 and the DCC5 (can release the resources of the first PUCCHs linked to the DCC1, the DCC3 and the DCC5, and can maintain the release of the resources of the first PUCCHs linked to the DCC2 and the DCC5).

Another example of the processing flow of the base station apparatus 100 and the mobile station apparatus 200 in FIG. 6 will be further described. As described above, before the subframe #n of FIG. 6, the base station apparatus 100 sets the five downlink carrier elements (the DCC1, the DCC2, the DCC3, the DCC4 and the DCC5) as the DCC set to the mobile station apparatus 200 (step S1). Before the subframe #n, the base station apparatus 100 uses the RRC signaling to semi-statically set (allocate) (a plurality of) first PUCCHs for the transmission of the control information of HARQ by the mobile station apparatus 200. For example, in FIG. 6, the base station apparatus 100 can set the four first PUCCHs linked to the DCC1, the DCC2, the DCC4 and the DCC5 to the mobile station apparatus 100. For example, the base station apparatus 100 sets the linking between the DCC3 and one uplink carrier element. In other words, the PUCCH set on the one uplink carrier element linked to the DCC3 is associated, as the second PUCCH, with the PDCCH transmitted on the DCC3.

The subframe #n indicates a subframe in which the five downlink carrier elements (the DCC1, the DCC2, the DCC3, the DCC4 and the DCC5) set by the base station apparatus 100 as the DCC set are not activated. In other words, the subframe #n indicates a subframe in which the base station apparatus 100 does not set the DCC active set for the mobile station apparatus 200. Here, the four first PUCCHs linked to the DCC1, the DCC2, the DCC4 and the DCC5 are set (allocated) to the mobile station apparatus 200.

Between the subframe #n and the subframe #n+m, the base station apparatus 100 sets the four downlink carrier elements (the DCC1, the DCC2, the DCC3 and the DCC5) to the mobile station apparatus 200 as the DCC active set (step S2). In other words, the deactivation for the DCC4 is maintained. Here, the mobile station apparatus 200 can select (modify) the resources of the first PUCCHs for the transmission of the control information of HARQ according to the DCC active set that is set by the base station apparatus 100. Specifically, the mobile station apparatus 200 can select (modify), according to the DCC active set, the resources of the first PUCCHs linked to the DCC1, the DCC2, and the DCC5 as the resources of the first PUCCHs for the transmission of the control information of HARQ. Here, the resources of the first PUCCHs linked to the DCC4 are kept set (allocated) to the mobile station apparatus 200.

In the subframe #n+m, the base station apparatus 100 uses (a plurality of) PDCCHs to set (allocate) (a plurality of) PDSCHs to the mobile station apparatus 200 (step S3). The base station apparatus 100 also uses (a plurality of) PDSCHs to transmit, to the mobile station apparatus 200, (a plurality of) downlink transport blocks in the same subframe. For example, the base station apparatus 100 transmits the PDCCH on each of the four downlink carrier elements (the DCC1, the DCC2, the DCC3 and the DCC5) and sets four PDSCHs. The base station apparatus 100 also uses the four PDSCHs, and transmits, to the mobile station apparatus 200, the four downlink transport blocks in the same subframe. The base station apparatus 100 associates the second PUCCH with the PDCCH transmitted on the DCC3, and dynamically sets (allocates) the second PUCCH to the mobile station apparatus 200. In other words, the base station apparatus 100 sets the DCC active set, and thereby dynamically sets the second PUCCH to the mobile station apparatus 200 in the same subframe as (a plurality of) first PUCCHs semi-statically set.

In the uplink subframe corresponding to the subframe #n+m, the mobile station apparatus 200 transmits the control information of HARQ for (a plurality of) PDCCHs and/or (a plurality of) downlink transport blocks to the base station apparatus 100 (step S4). In other words, the mobile station apparatus 200 uses the three first PUCCHs selected (modified) according to the DCC active set and/or the second PUCCH dynamically allocated, and thereby can transmit the control information of HARQ to the base station apparatus 100. In this case, the mobile station apparatus 200 bundles the control information of HARQ, and can transmit it to the base station apparatus 100. The mobile station apparatus 200 also multiplexes the control information of HARQ, and can transmit it to the base station apparatus 100.

Between the subframe #n+m and the subframe #n+p, the base station apparatus 100 sets the three downlink carrier elements (the DCC1, the DCC3 and the DCC4) to the mobile station apparatus 200 as the DCC active set (step S5). In other words, the base station apparatus 100 deactivates the two downlink carrier elements (the DCC2 and the DCC5). Here, the mobile station apparatus 200 can select (modify), according to the DCC active set by the base station apparatus 100, the resources of the first PUCCH for the transmission of the control information of HARQ. In other words, the mobile station apparatus 200 can select (modify), according to the DCC active set, the resources of the first PUCCHs linked to the DCC1 and the DCC4 as the resources of the first PUCCHs for the transmission of the control information of HARQ. Here, the resources of the first PUCCHs linked to the DCC2 and the DCC5 are kept set (allocated) to the mobile station apparatus 200.

In the subframe #n+p, the base station apparatus 100 uses (a plurality of) PDCCHs to set (a plurality of) PDSCHs to the mobile station apparatus 200 (step S6). The base station apparatus 100 also uses (a plurality of) PDSCHs to transmit, to the mobile station apparatus 200, (a plurality of) downlink transport blocks in the same subframe. For example, the base station apparatus 100 transmits the PDCCH on each of the three activated downlink carrier elements (the DCC1, the DCC3 and the DCC4) and sets three PDSCHs. The base station apparatus 100 also uses the three PDSCHs, and transmits, to the mobile station apparatus 200, the three downlink transport blocks using the three PDSCHs. Furthermore, the base station apparatus 100 associates the second PUCCH with the PDCCH transmitted on the DCC3, and dynamically sets the second PUCCH to the mobile station apparatus 200.

In the uplink subframe corresponding to the subframe #n+p, the mobile station apparatus 200 transmits the control information of HARQ for (a plurality of) PDSCHs and/or (a plurality of) downlink transport blocks to the base station apparatus 100. In other words, the mobile station apparatus 200 uses the two first PUCCHs selected (modified) according to the DCC active set and/or the second PUCCH dynamically allocated, and thereby can transmit the control information of HARQ to the base station apparatus 100. In this case, the mobile station apparatus 200 bundles the control information of HARQ, and can transmit it to the base station apparatus 100. The mobile station apparatus 200 also multiplexes the control information of HARQ, and can transmit it to the base station apparatus 100.

Between the subframe #n+p and the subframe #n+q, the base station apparatus 100 deactivates the five downlink carrier elements (the DCC1, the DCC2, the DCC3, the DCC4 and the DCC5). In this case, the four first PUCCHs linked to the DCC1, the DCC2, the DCC4 and the DCC5 are set (allocated) to the mobile station apparatus 200.

As described above, in the second embodiment, the base station apparatus 100 sets the DCC active set to the mobile station apparatus 200, and the mobile station apparatus 200 activates (adds, maintains) and/or releases, according to the DCC active set that is set by the base station apparatus 100, the resources of the first PUCCHs, and uses the first PUCCHs and/or the second PUCCHs and thereby can transmit the control information of HARQ to the base station apparatus 100. The base station apparatus 100 sets the DCC active set to the mobile station apparatus 200, and the mobile station apparatus 200 selects (modifies), according to the DCC active set that is set by the base station apparatus 100, and uses the first PUCCHs and/or the second PUCCHs and thereby can transmit the control information of HARQ to the base station apparatus 100. In this case, the mobile station apparatus 200 bundles the control information of HARQ, and can transmit it to the base station apparatus 100. The mobile station apparatus 200 also multiplexes the control information of HARQ, and can transmit it to the base station apparatus 100.

As described above, the base station apparatus 100 and the mobile station apparatus 200 transmit and receive the control information of HARQ, and thus the base station apparatus 100 can set the first PUCCHs according to the DCC active set, with the result that it is possible to effectively set the resources of the uplink. The base station apparatus 100 also sets the first PUCCHs according to the DCC active set, and thus it is possible to effectively set the first PUCCHs for the mobile station apparatus 200. Moreover, the mobile station apparatus 200 bundles or multiplexes the control information of HARQ, and transmits it to the base station apparatus 100, and thus it is possible to reduce the transmit power in the mobile station apparatus 200 and transmit the control information of HARQ. The mobile station apparatus 200 uses any one of (a small number of) (a plurality of) PUCCHs set by the base station apparatus 100, and transmits the control information of HARQ, and thus it is possible to transmit the control information of HARQ while reducing the transmit power in the mobile station apparatus 200.

In other words, when the base station apparatus 100 and the mobile station apparatus 200 use a broadband frequency band composed of a plurality of carrier elements to perform communication, it is possible to achieve the method of setting the resources by the base station apparatus 100 and the effective transmission and reception of the control information of HARQ with consideration given to the transmit power in the mobile station apparatus 200. Although, here, in the second embodiment, a description has been given of the example of the operation of the base station apparatus 100 and the mobile station apparatus 200 in the mobile communication system that has been subjected to the symmetric frequency band aggregation, the same method can be naturally applied to a mobile communication system that has been subjected to asymmetric frequency band aggregation.

A program that is operated in the mobile station apparatus 200 and the base station apparatus 100 according to the present invention is a program (a program for making a computer function) for controlling a CPU and the like to achieve the functions of the present embodiment according to the present invention. Then, information handled by these devices is temporarily stored in a RAM after the processing, and then is stored in various ROMS and HDDs, is read by the CPU as necessary and is subjected to modification and writing. As a recording medium that stores the program, any medium such as a semiconductor medium (for example, a ROM or a nonvolatile memory card), an optical recording medium (for example, a DVD, a MO, a MD, a CD or a BD) or a magnetic recording medium (for example, a magnetic tape or a flexible disc) may be used. The program loaded is performed to achieve the functions of the present embodiment described above, and, in addition, based on an instruction from the program, processing is performed either by an operating system or together with another application program or the like, with the result that the functions of the present invention may be achieved. When the program is distributed in the market, the program can be stored in a portable recording medium and distributed or be transferred to a server computer connected through a network such as the Internet. In this case, a storage device of the server computer is also included in the present invention. Part or all of the mobile station apparatus 200 and the base station apparatus 100 described above and according to the present embodiment may be realized as an LSI that is a typical integrated circuit. Each functional block of the mobile station apparatus 200 and the base station apparatus 100 may be individually integrated into a chip or part or all thereof may be integrated into a chip. The method of achieving an integrated circuit is not limited to an LSI; it may be achieved by a dedicated circuit or a general-purpose processor. When advances in the semiconductor technology produce a technology for achieving an integrated circuit instead of an LSI, it is also possible to use the integrated circuit produced by such a technology. Although the embodiment of the present invention has been described above in detail with reference to the drawings, the specific configuration is not limited to this embodiment, and a design and the like without departing from the spirit of the present invention are also included in the scope of claims. Although the embodiment of the present invention has been described above in detail with reference to the drawings, the specific configuration is not limited to this embodiment, and a design and the like without departing from the spirit of the present invention are also included in the scope of claims.

100 base station apparatus
101 data control portion
102 transmission data modulation portion
103 radio portion
104 scheduling portion
105 channel estimation portion
106 reception data demodulation portion
107 data extraction portion
108 higher layer
109 antenna
110 radio resource control portion
200 (200-1, 200-2, 200-3) mobile station apparatus
201 data control portion
202 transmission data modulation portion
203 radio portion
204 scheduling portion
205 channel estimation portion
206 reception data demodulation portion
207 data extraction portion
208 higher layer
209 antenna
210 radio resource control portion

The invention claimed is:

1. A mobile station apparatus comprising;
receiving circuitry configured to and/or programmed to:
receive, from a base station apparatus, a radio resource control signal including a parameter which is used for configuring a plurality of physical uplink control channel resources, the plurality of physical uplink control channel resources being configured on an uplink component carrier in which Hybrid Automatic Repeat Request (HARQ) control information is transmitted on a physical uplink control channel,
receive on a first physical downlink control channel in a sub-frame on a first downlink component carrier, from the base station apparatus, first downlink control information which is used for scheduling of a first physical downlink shared channel transmission, the first downlink component carrier being linked to the uplink component carrier, and
receive on a second physical downlink control channel in the sub-frame on a second downlink component carrier, from the base station apparatus, second downlink control information which is used for scheduling of a second physical downlink shared channel transmission, and
transmitting circuitry configured to and/or programmed to:
transmit, to the base station apparatus, information bits using either of a first physical uplink control channel resource or a second physical uplink control channel resource, the information bits being used for indicating the HARQ control information, wherein
for the first physical downlink shared channel transmission scheduled by using the first downlink control information which is received on the first downlink control channel in the sub-frame on the first downlink component carrier, the first physical uplink control channel resource is determined based on a control channel element of the first physical downlink control channel, and
for the second physical downlink shared channel transmission scheduled by using the second downlink control information which is received on the second downlink control channel in the sub-frame on the second downlink component carrier, the second physical uplink control channel resource is determined from the plurality of physical uplink control channel resources which is configured.

2. The mobile station apparatus according to claim 1, wherein
the HARQ control information includes information indicating a positive acknowledgment or a negative acknowledgment for each of transport blocks received on the first downlink component carrier and the second downlink component carrier.

3. The base station apparatus comprising:
  transmitting circuitry configured to and/or programmed to:
    transmit, to a mobile station apparatus, a radio resource control signal including a parameter which is used for configuring a plurality of physical uplink control channel resources, the plurality of physical uplink control channel resources being configured on an uplink component carrier in which Hybrid Automatic Repeat Request (HARQ) control information is transmitted on a physical uplink control channel,
    transmit on a first physical downlink control channel in a sub-frame on a first downlink component carrier, to the mobile station apparatus, first downlink control information which is used for scheduling of a first physical downlink shared channel transmission, the first downlink component carrier being linked to the uplink component carrier, and
    transmit on a second physical downlink control channel in the sub-frame on a second downlink component carrier, to the mobile station apparatus, second downlink control information which is used for scheduling of a second physical downlink shared channel transmission, and
  receiving circuitry configured to and/or programmed to:
    receive, from the mobile station apparatus, information bits using either of a first physical uplink control channel resource or a second physical uplink control channel resource, the information bits being used for indicating the HARQ control information, wherein
    for the first physical downlink shared channel transmission scheduled by using the first downlink control information which is transmitted on the first downlink control channel in the sub-frame on the first downlink component carrier, the first physical uplink control channel resource is scheduled based on a control channel element of the first physical downlink control channel, and
    for the second physical downlink shared channel transmission scheduled by using the second downlink control information which is transmitted on the second downlink control channel in the sub-frame on the second downlink component carrier, the second physical uplink control channel resource is scheduled from the plurality of physical uplink control channel resources which is configured.

4. The base station apparatus according to claim 3, wherein
  the HARQ control information includes information indicating a positive acknowledgment or a negative acknowledgment for each of transport blocks transmitted on the first downlink component carrier and the second downlink component carrier.

5. A communication method of a mobile station apparatus comprising;
  receiving, from a base station apparatus, a radio resource control signal including a parameter which is used for configuring a plurality of physical uplink control channel resources, the plurality of physical uplink control channel resources being configured on an uplink component carrier in which Hybrid Automatic Repeat Request (HARQ) control information is transmitted on a physical uplink control channel,
  receiving on a first physical downlink control channel in a sub-frame on a first downlink component carrier, from the base station apparatus, first downlink control information which is used for scheduling of a first physical downlink shared channel transmission, the first downlink component carrier being linked to the uplink component carrier,
  receiving on a second physical downlink control channel in the sub-frame on a second downlink component carrier, from the base station apparatus, second downlink control information which is used for scheduling of a second physical downlink shared channel transmission, and
  transmitting, to the base station apparatus, information bits using either of a first physical uplink control channel resource or a second physical uplink control channel resource, the information bits being used for indicating the HARQ control information, wherein
  for the first physical downlink shared channel transmission scheduled by using the first downlink control information which is received on the first downlink control channel in the sub-frame on the first downlink component carrier, the first physical uplink control channel resource is determined based on a control channel element of the first physical downlink control channel, and
  for the second physical downlink shared channel transmission scheduled by using the second downlink control information which is received on the second downlink control channel in the sub-frame on the second downlink component carrier, the second physical uplink control channel resource is determined from the plurality of physical uplink control channel resources which is configured.

6. The communication method according to claim 5, wherein
  the HARQ control information includes information indicating a positive acknowledgment or a negative acknowledgment for each of transport blocks received on the first downlink component carrier and the second downlink component carrier.

7. A communication method of a base station apparatus comprising:
  transmitting, to a mobile station apparatus, a radio resource control signal including a parameter which is used for configuring a plurality of physical uplink control channel resources, the plurality of physical uplink control channel resources being configured on an uplink component carrier in which Hybrid Automatic Repeat Request (HARQ) control information is transmitted on a physical uplink control channel,
  transmitting on a first physical downlink control channel in a sub-frame on a first downlink component carrier, to the mobile station apparatus, first downlink control information which is used for scheduling of a first physical downlink shared channel transmission, the first downlink component carrier being linked to the uplink component carrier,
  transmitting on a second physical downlink control channel in the sub-frame on a second downlink component carrier, to the mobile station apparatus, second downlink control information which is used for scheduling of a second physical downlink shared channel transmission, and
  receiving, from the mobile station apparatus, information bits using either of a first physical uplink control channel resource or a second physical uplink control channel resource, the information bits being used for indicating the HARQ control information, wherein for the first physical downlink shared channel transmission scheduled by using the first downlink control information which is transmitted on the first downlink control channel in the sub-frame on the first downlink component carrier, the first physical uplink control channel resource is scheduled based on a control channel element of the first physical downlink control channel, and for the second physical downlink shared channel transmission scheduled by using the second downlink control information which is transmitted on the second downlink control channel in the sub-frame on the second downlink component carrier, the second physical uplink control channel resource is scheduled from the plurality of physical uplink control channel resources which is configured.

8. The communication method according to claim 7, wherein the HARQ control information includes information indicating a positive acknowledgment or a negative acknowledgment for each of transport blocks transmitted on the first downlink component carrier and the second downlink component carrier.

* * * * *